(12) United States Patent
Peeters et al.

(10) Patent No.: US 10,473,275 B2
(45) Date of Patent: Nov. 12, 2019

(54) LIGHTING DEVICE WITH PLURALITY OF STACKED LUMINESCENT CONCENTRATORS

(71) Applicant: SIGNIFY HOLDING B.V., Eindhoven (NL)

(72) Inventors: Martinus Petrus Joseph Peeters, Eindhoven (NL); Rémy Cyrille Broersma, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/060,357

(22) PCT Filed: Dec. 6, 2016

(86) PCT No.: PCT/EP2016/079887
§ 371 (c)(1),
(2) Date: Jun. 7, 2018

(87) PCT Pub. No.: WO2017/097762
PCT Pub. Date: Jun. 15, 2017

(65) Prior Publication Data
US 2018/0363858 A1 Dec. 20, 2018

(30) Foreign Application Priority Data
Dec. 11, 2015 (EP) ..................................... 15199578

(51) Int. Cl.
*F21V 9/08* (2018.01)
*F21K 9/61* (2016.01)
(Continued)

(52) U.S. Cl.
CPC .................. *F21K 9/61* (2016.08); *F21K 9/64* (2016.08); *G02B 6/00* (2013.01); *G02B 6/0003* (2013.01);
(Continued)

(58) Field of Classification Search
CPC ...... F21V 9/08; F21V 9/10; F21V 9/16; F21K 2/00
See application file for complete search history.

(56) References Cited

U.S. PATENT DOCUMENTS 5,128,846 A * 7/1992 Mills .................... F21V 9/08
362/223
6,350,041 B1 * 2/2002 Tarsa .................... F21V 7/0091
257/E33.072
(Continued)

FOREIGN PATENT DOCUMENTS

EP 1795798 A1 6/2007
EP 2947484 A1 11/2015
(Continued)

*Primary Examiner* — Ismael Negron
(74) *Attorney, Agent, or Firm* — Akarsh P. Belagodu

(57) ABSTRACT

Lighting device includes a first concentrator with a first luminescent material, a second concentrator with a second luminescent material having an absorption band overlapping with the emission band of the first luminescent material, and a plurality of light sources arranged to project light into a first input surface of the first concentrator to be converted at least partially into a first converted light by the first luminescent material and outputted from a first output surface of the first luminescent concentrator. The second concentrator arranged parallel to the first concentrator such that light from the light sources that leaks from a side surface of the first concentrator is received by the second concentrator and converted by the second luminescent material and outputted from a second exit surface of the second concentrator. The first and second concentrators having different lengths.

15 Claims, 9 Drawing Sheets

(51) Int. Cl.
*F21V 8/00* (2006.01)
*F21K 9/64* (2016.01)
*G02B 6/00* (2006.01)
*F21Y 115/10* (2016.01)

(52) U.S. Cl.
CPC ......... *G02B 6/0068* (2013.01); *G02B 6/0076* (2013.01); *F21Y 2115/10* (2016.08)

(56) References Cited

U.S. PATENT DOCUMENTS

| | | | |
|---|---|---|---|
| 6,744,960 B2 * | 6/2004 | Pelka | B82Y 10/00 362/259 |
| 7,235,792 B2 * | 6/2007 | Elofson | C09K 11/02 250/205 |
| 7,316,497 B2 * | 1/2008 | Rutherford | H04N 9/315 348/E9.027 |
| 7,857,457 B2 * | 12/2010 | Rutherford | G03B 21/2013 353/31 |
| 9,151,884 B2 * | 10/2015 | Rutherford | G02B 6/0003 |
| 2008/0055897 A1 | 3/2008 | Yoshida et al. | |
| 2014/0063853 A1 | 3/2014 | Nichol et al. | |
| 2014/0153215 A1 | 6/2014 | Hayama | |
| 2017/0139113 A1 * | 5/2017 | Peeters | F21S 41/24 |

FOREIGN PATENT DOCUMENTS

| | | |
|---|---|---|
| WO | WO2006054203 A1 | 5/2006 |
| WO | WO2014198619 A1 | 12/2014 |
| WO | WO2015058979 A1 | 4/2015 |

* cited by examiner

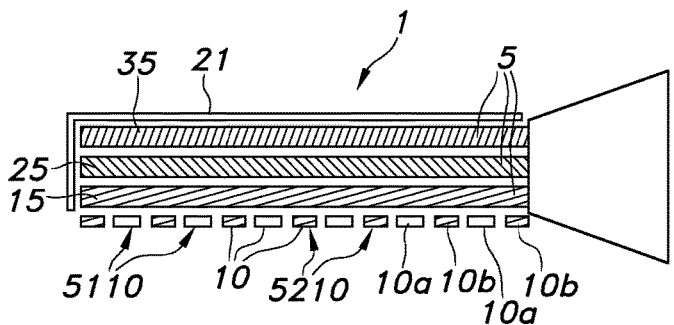
FIG. 7A
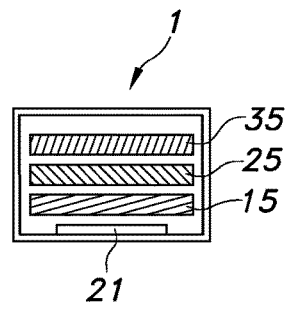
FIG. 7B
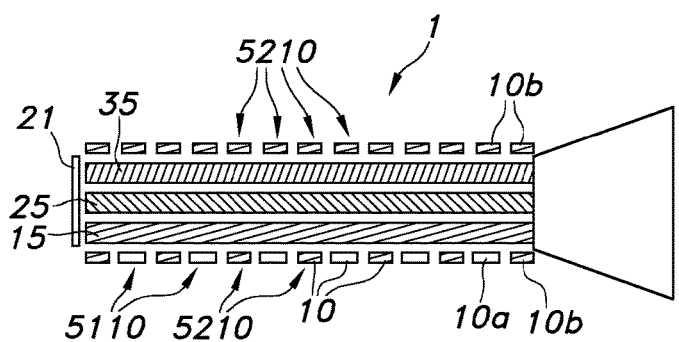
FIG. 7C
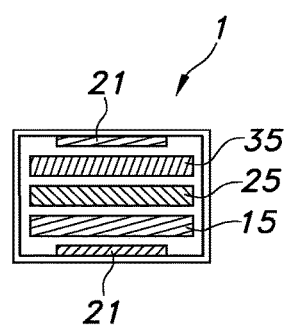
FIG. 7D
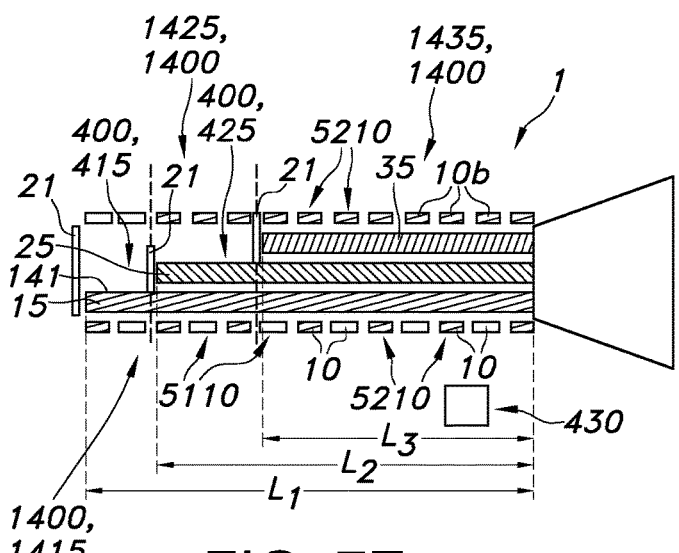
FIG. 7E
FIG. 7F

LIGHTING DEVICE WITH PLURALITY OF STACKED LUMINESCENT CONCENTRATORS

CROSS-REFERENCE TO PRIOR APPLICATIONS

This application is the U.S. National Phase application under 35 U.S.C. § 371 of International Application No. PCT/EP2016/079887, filed on Dec. 6, 2016, which claims the benefit of European Patent Application No. 15199578.4, filed on Dec. 11, 2015. These applications are hereby incorporated by reference herein.

FIELD OF THE INVENTION

The invention relates to a lighting device, such as for use in a projector or in automotive lighting or for stage lighting.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

WO2014/198619 describes a light emitting device comprising a light source adapted for, in operation, emitting light with a first spectral distribution, a first light guide comprising a first light input surface and a first light exit surface arranged opposite to one another, and further comprising an end surface extending perpendicular with respect to the first light input surface, and a second light guide comprising a second light input surface and a second light exit surface extending perpendicular with respect to one another. The first light guide is adapted for receiving the light with the first spectral distribution from the light source at the first light input surface, guiding the light with the first spectral distribution to the first light exit surface and to the end surface and coupling a part of the light with the first spectral distribution out of the first light exit surface into the second light guide and coupling another part of the light with the first spectral distribution out of the end surface. The second light guide is adapted for receiving light with the first spectral distribution coupled out of the first light guide at the second light input surface, guiding the light to the second light exit surface, converting at least a part of the light with the first spectral distribution to light with a second spectral distribution and coupling the light with the second spectral distribution out of the second light exit surface.

EP1795798 describes a light emitting device, comprising: an excitation light source that emits excitation light; a wavelength conversion member that absorbs the excitation light emitted from the excitation light source, converts its wavelength, and releases light of a predetermined wavelength band; a light guide in which the center part (core) of its cross section has a refractive index that is higher than the refractive index of the peripheral portion (cladding), and which guides the light emitted from the wavelength conversion member to the outside; and wherein the wavelength conversion member is produced by laminating a plurality of layers that wavelength-convert different wavelengths of light.

EP2947484 describes a light emitting device comprising at least one first light source adapted for, in operation, emitting first light with a first spectral distribution, at least one second light source adapted for, in operation, emitting second light with a second spectral distribution, a light guide comprising at least one first light input surface, at least one second light input surface and a first light exit surface, the at least one first light input surface and the first light exit surface extending at an angle different from zero with respect to each other, and a luminescent element arranged adjacent the first light exit surface, the light guide being adapted for converting at least a part of the first light with the first spectral distribution to third light with a third spectral distribution, guiding the second light and coupling at least a part of the third light and at least a part of the second light out of the first light exit surface, the luminescent element being adapted for converting at least a part of the second light to fourth light with a fourth spectral distribution.

WO2015/058979 describes a light emitting device comprising a first light source and a second light source adapted for, in operation, emitting light with a first spectral distribution and light with a second spectral distribution, respectively, a first light guide and a second light guide comprising a first light input surface and a first light exit surface, respectively, the light input surface and the light exit surface of the respective light guide extending at an angle different from zero with respect to each other, the first and second light guide being adapted for receiving the light with the first and second spectral distribution, respectively, at the first and second light input surface, converting at least a part of the received light to light with a third spectral distribution and light with a fourth spectral distribution, respectively, guiding the light to the first and second light exit surface, respectively, and coupling at least a part of the light with the third and fourth spectral distribution out of the first and second light exit surface, respectively, wherein the light having the first spectral distribution and the light having the second spectral distribution have different spectral distributions, and the light having the third spectral distribution and the light having the fourth spectral distribution have different spectral distributions.

SUMMARY OF THE INVENTION

High brightness light sources are interesting for various applications including spots, stage-lighting, headlamps and digital light projection. For this purpose, it is possible to make use of so-called light concentrators where shorter wavelength light is converted to longer wavelengths in a highly transparent luminescent material. A rod of such a transparent luminescent material can be used. When illuminated by LEDs it produces longer wavelength light within the rod due to conversion of the LED light by the luminescent material. Converted light which will stay in the luminescent material such as a doped garnet in the waveguide mode and can then be extracted from one of the surfaces leading to an intensity gain.

Hence, high brightness sources can be created using LEDs in combination with a luminescent concentrator. Converters, such as ceramic converters, should especially be extremely transparent to be efficient (light should remain in total internal reflection (TIR) till the end of the rod). The light generated in the rod is substantially isotropically distributed. As a consequence a substantial fraction of the light may not be light-guided to the nose of the rod by TIR, leading to a limited efficiency.

Luminescent concentrators are based on luminescent materials (also called "phoshors"). The phosphor systems that can be used in general have a small overlap between excitation and emission spectrum, leading to reabsorption. So only a limited fraction of the light reflected back into the rod will undergo re-absorption, and has a change to be captured in TIR again. Hence, the efficiency of the luminescent concentrator concept is limited as a large fraction of the light generated will not be captured in TIR and appears to escape from the long sides of the rod.

Further, when using a plurality of interrelated concentrators a defined spectral distribution of the device light may be provided which may not easily be tunable. For instance, the device may be configured to provide white light, but it may not be possible to provide e.g. also one or more primary colors (such as blue, green, yellow, etc.) that are used to provide the white light.

Hence, it is an aspect of the invention to provide an alternative lighting device, which preferably further at least partly obviates one or more of above-described drawbacks, and which may have a relatively good efficiency and a high intensity lighting device light.

Herein, it is proposed using a second luminescent material of another composition alongside a first luminescent concentrator (especially no optical contact and/or optically separated using a dichroic mirror). Especially, this second luminescent material has an absorption band overlapping with the emission band of the first luminescent material. As a consequence a significant part of the light generated by the first luminescent material will be absorbed by the second luminescent material resulting in a high brightness white source with increased efficiency.

In a first aspect, the invention provides a lighting device (herein also indicated as "device") comprising: (i) a plurality of luminescent concentrators (herein also indicated as "concentrator"), especially each luminescent concentrator comprising an elongated light transmissive body having a first face and a second face defining a length (L) of the elongated body, the elongated body comprising one or more side edges, wherein one or more side edges comprise one or more radiation input faces, wherein the second face comprises a radiation exit window; each elongated light transmissive body comprising a luminescent material configured to convert at least part of a pump radiation received at one or more radiation input faces into luminescent material light, and each luminescent concentrator configured to couple at least part of the luminescent material light out at the radiation exit window as converter light; (ii) a plurality of light sources configured to provide light source radiation as first pump radiation to the one or more radiation input faces of a first luminescent concentrator; (iii) said first luminescent concentrator comprising a first luminescent material ("first material") configured to convert at least part of the first pump radiation into first luminescent material light, and configured to couple at least part of the first luminescent material light out at the first radiation exit window as first converter light; (iv) a second luminescent concentrator configured parallel to the first luminescent concentrator with a side edge of the first luminescent concentrator configured parallel to a side edge of the second luminescent concentrator, wherein the second luminescent concentrator is configured to receive at said side edge of the second luminescent concentrator one or more of said first pump radiation and said first luminescent material light escaping from said side edge of said first luminescent concentrator as second pump radiation, the second luminescent concentrator comprising a second luminescent material ("second material") configured to convert at least part of the second pump radiation into second luminescent material light, and configured to couple at least part of the second luminescent material light out at the second radiation exit window as second converter light.

In embodiments, the luminescent concentrators may essentially have identical lengths. In yet other embodiments, the two or more luminescent concentrators may have different lengths. When there are more than two concentrators, in embodiments at least two concentrators may have different lengths, and optionally two or more concentrators may have identical lengths. With concentrators of different lengths, over the length two adjacent concentrators are configured parallel, radiation may escape from one concentrator to the other, whereas over the length the two concentrators are not adjacent (because of the difference in lengths), one of the concentrators has a concentrator extending part (which essentially cannot provide radiation to the other concentrator, as said other concentrator is not adjacent over the concentrator extending part). In a specific embodiment, one or more of the luminescent concentrators are longer than one or more of the other luminescent concentrators, thereby providing one or more luminescent concentrator extending parts extending relative to the one or more other luminescent concentrators, and wherein a subset of one or more light sources is configured to provide light source radiation to the one or more luminescent concentrator extending parts. Over the length of the extending part, there may be no adjacent luminescent concentrator (over at least part of the length of a side edge).

In this way, when addressing with the light sources the luminescent concentrator extending parts, essentially only radiation is generated that is intrinsic to the specific luminescent concentrator. Hence, in this way it may be prevented that light of other concentrators is generated or at least the contribution thereof may be minimized. In this way, one may not only provide device light that comprises concentrator light of two or more luminescent concentrators, it may also be possible to provide device light that may essentially comprise concentrator light of only a single concentrator, as in this concentrator essentially only the luminescent material in the luminescent concentrator extending parts is excited by the light source light whereas other parts of the luminescent concentrator may not be excited by the light sources.

Good results may be obtained when the differences in length between the largest concentrator and the smallest concentrator are less than about 50% of the length of the largest concentrator. Especially, a minimum difference in length between two concentrators that (essentially) differ in length is in the range of at least 5%, like at least 10% of length of the larger concentrator. Hence, when using a plurality of luminescent concentrators, one or more luminescent concentrators may have identical lengths but one or more luminescent concentrators may also have different lengths, such as to provide the extending parts, with a length difference between the largest concentrator and the shortest concentrator of in the range of 5-50%, such as 5-30% of the length of the largest concentrator. With such minimum length difference it appears that outcoupling to an adjacent concentrator of light generated in the extending part which propagates in the direction the respective radiation exit window may be minimized, even though over part of the length between the extending part and the radiation exit window the luminescent concentrators are configured adjacent.

As indicated above, a subset of one or more light sources is configured to provide light source radiation to the one or more luminescent concentrator extending parts. This especially implies that these one or more light sources provide (their) light source as pump radiation essentially only to the respective luminescent concentrator extending part(s). Thus, such light sources provide light to the radiation input face of the radiation extending part of the respective luminescent concentrator. This may lead to an outcoupling of converter light essentially only via the concentrator, and not via also an adjacent concentrator.

Therefore, especially the device also comprises a control system (which may also be indicated as "controller") for controlling the light sources. In this way, intensities of the light source light of light sources may be controlled, and e.g. one or more luminescent concentrators may be irradiated over a substantial length or e.g. a specific extending part of one luminescent concentrator may essentially be irradiated with one or more light sources, with other light sources that do not address that specific extending part at low or zero intensities. Hence, in yet further embodiments the lighting device is configured to provide device light comprising converter light of one or more luminescent concentrators, wherein the lighting device further comprises a control system configured to control one or more of intensity, color temperature, and color of the device light by controlling a light intensity of the plurality of light sources, especially configured to control one or more of color temperature and color of the device light. In further embodiments, the control system may be configured to control the intensity and one or more of color temperature and color of the device light.

Hence, the invention especially provides a lighting device configured to provide one of (i) white device light and (ii) colored device light in dependence of a setting chosen by the control system. As the plurality of light sources are configured over at least part of the length(s) of one or more luminescent concentrators, by selecting a subset of the light sources, the optical properties such as color and color temperature, intensity of the device light generated by the device during operation may be controlled. Hence, in embodiments one or more subsets of each one or more light sources (i.e. each subset including one or more (identical or different) light sources) are configured to provide light source radiation to the one or more luminescent concentrator extending parts, respectively. Further, one or more subsets of each one or more light sources are especially configured to provide light source radiation to the one or more luminescent concentrators in the adjacent (and not extending) part(s).

Especially, a longer concentrator may include a luminescent material that is configured to provide luminescence that is spectrally blue shifted relative to the luminescence of the luminescent material of an adjacent shorter luminescent concentrator. This allows e.g. blue light from the longer concentrator and blue and yellow light from both concentrators, i.e. the device light may be blue or white. Likewise, when e.g. three concentrators with different luminescent materials are applied, blue, green and red may be combined, with the blue luminescent concentrator being the longest, the green luminescent concentrator having an intermediate length, and the red luminescent concentrator having the shortest length. With light sources essentially addressing only the extending part of the longest concentrator blue light may be provided, and with light sources essentially addressing only the extending part of the intermediate concentrator only green light may be provided (which may not be reabsorbed by either the larger concentrator, as the energy is lower than the absorption band, nor by the smaller concentrator, as the extending part is pumped). Therefore, in embodiments the lighting device comprises a luminescent concentrator having a longer length than another luminescent concentrator, the former luminescent concentrator having an extending part relative to the latter, wherein the former luminescent concentrator is configured to provide converter light having a spectral distribution being blue shifted relative to a spectral distribution of converter light provided by said latter luminescent concentrator.

In yet further embodiments, the plurality of light sources comprise a first subset of light sources configured to provide first subset light source light and a second subset of light sources configured to provide second subset light source light, the first subset light source light and the second subset light source light having different spectral distributions. As in general the two or more of the luminescent materials have mutually different excitation oscillator strength ratios for the first subset light source light and the second subset light source light, the spectral composition of the light generated by the lighting device (herein also indicated as "lighting device light") may be tuned. Therefore, in specific embodiments the plurality of light sources comprise a first subset of light sources configured to provide first subset light source light and a second subset of light sources configured to provide second subset light source light, the first subset light source light and the second subset light source light having different spectral distributions and wherein two or more of the luminescent materials, have mutually different excitation oscillator strength ratios for the first subset light source light and the second subset light source light. Hence, the control system may control individual light sources or subsets of light sources.

With such lighting device, light that may escape from a side edge (and which may thus not be useful as it does not escape from the radiation exit window), may nevertheless be useful as it can be used to pump the second luminescent concentrator. In this way, higher (overall) efficiencies can be achieved. Hence, by configuring one or more second luminescent concentrators adjacent to a first luminescent concentrator, a more efficient lighting device can be created, as non-used and transmitted pump radiation and/or luminescent material light escaping from the first luminescent concentrator at a side edge may be incoupled in the second luminescent concentrator, and may be reused. The second luminescent concentrator may essentially be pumped via the first luminescent concentrator or may alternatively in addition also be pumped via second light sources (see further below). Further, by the choice and the position of the stack and pump LEDs, some color tune-ability may also be introduced.

Especially, the first luminescent material of the first luminescent concentrator(s) is different from the second luminescent material of the second luminescent concentrator(s). For instance, the latter may absorb first luminescent material light of the former. Hence, the first luminescent material and the second luminescent material (and the optional third luminescent material etc.) may have different compositions. The term "different composition" may refer to a different chemical composition but may in embodiments also refer to different activator concentrations (such as activator concentration differences of at least 10%).

In specific embodiments, the spectral distribution of the excitation when viewing in emission the first luminescent material light is different from the spectral distribution of the excitation when viewing in emission the second luminescent material light. In other words, the first luminescent material has another excitation spectrum than the second luminescent material. This difference may relate to one or more of peak height(s), peak shape(s) and peak position(s), especially at least peak position(s). In general, this will be the case when the first luminescent concentrator and the second luminescent concentrator comprise one or more of (i) different luminescent materials, (ii) different luminescent material concentrations, and (iii) different activator concentrations (e.g. Cerium in YAG, wherein cerium is an activator, as known to a person skilled in the art).

In specific embodiments, the spectral distribution of the emission when exciting the first luminescent material is different from the spectral distribution of the emission when exciting the second luminescent material. In other words, the first luminescent material has another emission spectrum than the second luminescent material. This difference may relate to one or more of peak height(s), peak shape(s) and peak position(s), especially at least peak position(s). In general, this will be the case when the first luminescent concentrator and the second luminescent concentrator comprise one or more of (i) different luminescent materials, (ii) different luminescent material concentrations, and (iii) different activator concentrations.

The lighting device is configured to provide lighting device light, which especially comprises said converter light of the first luminescent concentrator and said converter light of the second luminescent concentrator (and optionally converter light of a third luminescent concentrator (see also below). Even more especially, the lighting device is configured to provide white lighting device light.

The lighting device comprises a plurality of luminescent concentrators. In essence, the lighting device may include a single first luminescent concentrator and a single second luminescent concentrator, configured to convert at least part of the light escaping from a side edge of the first luminescent concentrator. However, the lighting device may also include a single first luminescent concentrator and a plurality of second luminescent concentrators, each configured to convert at least part of the light escaping from a side edge of the first luminescent concentrator. The second luminescent concentrators may be identical in spectral properties or there may be two or second luminescent concentrators having different spectral properties, e.g. second convert light with different spectral distributions.

Especially, the first luminescent concentrator and second luminescent concentrator (s) are stacked. Stacking may be in one or two dimensions. Further, the lighting device may comprise a plurality of sets of a first luminescent concentrator and (concomitant) second luminescent concentrator(s). The lighting device comprises a plurality of luminescent concentrators, such as in the range of 2-50, like 3-20 light concentrators. For instance, the invention may include a stack of a second luminescent concentrator, a first luminescent concentrator, irradiated by the light sources from side edges, and again a second luminescent concentrator.

The second light concentrator is thus especially configured downstream from the first light concentrator, and the light sources are configured (at least) upstream from the first light concentrator (and effectively also configured upstream from the second light concentrator). The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream". Further, the luminescent concentrators are especially configured parallel. Hence, especially the luminescent concentrators have substantially the same shape, such as all cuboid or all tubular shaped, etc. Hence, the term "parallel" may especially refer to concentrators having two side edges that have a mutual angle of less than 5°, such as less than 2° like 0°. As indicated above, the between two parallel arranged luminescent concentrators there is especially a non-zero distance, like in the range of 0.01-100 mm, such as in the range of 0.5-20 mm.

The first luminescent concentrator comprises a first luminescent material configured to convert at least part of the first pump radiation into first luminescent material light, and configured to couple at least part of the first luminescent material light out at the first radiation exit window as first converter light. Especially, the pump radiation is received at one or more radiation input faces. The term "first luminescent material" may also refer to a plurality of different first luminescent materials. Below, some examples of luminescent materials are provided.

The second luminescent concentrator is especially configured parallel to the first luminescent concentrator with a side edge of the first luminescent concentrator configured parallel to a side edge of the second luminescent concentrator. The second luminescent concentrator is configured to receive, at a said side edge of the second luminescent concentrator, one or more of said first pump radiation and said first luminescent material light escaping from said side edge of said first luminescent concentrator. The one or more of said first pump radiation and said first luminescent material light escaping from said side edge of said first luminescent concentrator are herein indicated as second pump radiation. Whether or not first pump radiation is available downstream of the first luminescent concentrator may amongst others depend upon the thickness of first the luminescent concentrator and the oscillator strength of the absorption or excitation of the first luminescent material comprised by the first luminescent concentrator.

The second luminescent concentrator comprises thus a second luminescent material configured to convert at least part of the second pump radiation into second luminescent material light. The second luminescent concentrator is configured to couple at least part of the second luminescent material light out at the second radiation exit window as second converter light. The term "second luminescent material" may also refer to a plurality of different second luminescent materials. Further, the term "second luminescent concentrator" may also refer to a plurality of different second luminescent concentrators. Below, some examples of luminescent materials are provided.

The lighting device light especially comprises at least the first converter light and the second converter light. Further, in embodiments the lighting device is configured to provide white lighting device light. However, with controlling different light sources and/or using different lengths of the luminescent concentrators, the spectral distribution of the lighting device light may be (further) controlled.

As indicated below, the luminescent concentrator may especially have a cuboid shape with a first face and a second face defining the length, and with side edges (defining a width and a height), of which one or more can be used to couple pump light into. The plurality of light sources are configured to provide light source radiation as first pump radiation to the one or more radiation input faces of a first luminescent concentrator. The other side edge(s) may face (a) second luminescent concentrator(s). The first luminescent concentrator and the second luminescent concentrator, and optionally one or more third luminescent concentrators, may especially be arranged parallel, such as in a stacked configuration.

Especially however, two parallel arranged luminescent concentrators are not in physical contact with each other or have a dichroic mirror arranged in between. The dichroic mirror may especially be configured to allow transmission of a lower order concentrator/converter light (such as the first concentrator or the second concentrator) to an adjacent higher order concentrator/converter (such as the second concentrator and the third concentrator, respectively) and configured to reflect higher order concentrator/converter light (such as the second concentrator and the third concentrator) to an adjacent lower order concentrator/converter (such as the first concentrator and the second concentrator, respectively).

The luminescent material light may escape from one or more faces or edges in addition to the escape from the second face (especially radiation exit window). The light that e.g. escapes from a side edge may be received by one or more other luminescent concentrators, e.g. first to second luminescent concentrator; second to third luminescent concentrator. In embodiments, at least part of the luminescent material light that escapes from a side edge from a lower order luminescent concentrator is reflected via one or more mirrors to the higher order luminescent concentrator. In such embodiments, less higher order luminescent concentrators may be used, which may be beneficial for the intensity of the light escaping from the radiation exit window. In such embodiments, the intensity relative to the total radiation exit window(s) area may be even higher. Further, such embodiments may also be beneficial for reducing the size of the device.

The lighting device comprises a plurality of light sources. Especially, the light source radiation of the plurality (m) of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (binning). The light sources are especially configured to provide a blue optical power ($W_{opt}$) of at least 0.2 Watt/mm$^2$ to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Assuming blue (excitation) light, this may e.g. correspond to a blue power ($W_{opt}$) provided to at least one of the radiation input faces of in average at least 0.067 Watt/mm$^2$ and 0.2 Watt/mm$^2$, respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source radiation is applied) is also an average over time.

In yet a further embodiment, especially for projector applications, the plurality of light sources are operated in pulsed operation with a duty cycle selected from the range of 10-80%, such as 25-70%.

Each first light concentrator may radiationally be coupled with one or more light sources, especially a plurality of light sources, such as 2-100, like 2-50 light sources. The term "radiationally coupled" especially means that the light source and the (first) light concentrator are associated with each other so that at least part of the radiation emitted by the light source is received by the first light concentrator (and at least partly converted into luminescence). In analogy, these conditions may apply when one or more second lighting devices are applied (see below). In analogy, these conditions may apply when one or more second lighting sources are applied (see also below).

In embodiments, the plurality of light sources are configured to provide UV light source radiation as first pump radiation, the first luminescent material is configured to convert at least part of the first pump radiation into blue first luminescent material light, and the second luminescent material is configured to convert at least part of the second pump radiation into yellow second luminescent material light. Hence, in such embodiments one or more of said first pump radiation and said first luminescent material light may escape from the side edge from the first luminescent concentrator and may thus be used as second pump radiation for the second luminescent concentrator. Hence, blue light and/or UV radiation may be used to excite the second luminescent material and provide said second luminescent material light. In yet other embodiments, the plurality of light sources are configured to provide blue light source radiation as first pump radiation, the first luminescent material is configured to convert at least part of the first pump radiation into green first luminescent material light, and the second luminescent material is configured to convert at least part of the second pump radiation into one or more of yellow second luminescent material light and red second luminescent material light. Note that in such embodiments one or more of said first pump radiation and said first luminescent material light may escape from the side edge from the first luminescent concentrator and may thus be used as second pump radiation for the second luminescent concentrator. Hence, green light and/or blue light may be used to excite the second luminescent material and provide said second luminescent material light.

As indicated above, the second pump radiation may include one or more of the first pump radiation and the first luminescent material light. The second luminescent material may be configured to convert only the first pump radiation, or only the first luminescent material light, or both the first pump radiation and the first luminescent material light. Hence, the second pump radiation does not necessarily comprise the first pump radiation in all embodiments. However, in embodiments this may be useful. Hence, in embodiments the first luminescent concentrator is configured to transmit at least part of the light source radiation, and the second pump radiation comprises (thus) at least part of said light source radiation transmitted by said first luminescent concentrator. This may especially be of relevance for those second luminescent materials that are able to convert at least part of the first pump radiation. The second luminescent concentrator is thus especially radiationally coupled with the first luminescent concentrator.

The second luminescent concentrator may essentially be pumped via the first luminescent concentrator only (i.e. the pump radiation being transmitted through the first luminescent concentrator and/or the first luminescent material light). However, in yet other embodiments, in addition to this pumping mechanism, the second luminescent concentrator may also be pumped directly. Hence, in embodiments the lighting device further comprises a plurality of second light sources configured to generate second light source light as first secondary pump radiation to the one or more radiation input faces of the second luminescent concentrator, wherein the second luminescent concentrator comprises said second luminescent material configured to convert (also) at least part of the first secondary pump radiation (received at one or more radiation input faces) into said second luminescent material light. The second (or third, see below) luminescent concentrator may thus radiationally be coupled with the second light sources.

As indicated above, the second luminescent concentrator is configured to couple at least part of the second luminescent material light out at the second radiation exit window as second converter light, and this second converter light may thus be the conversion result of second pump radiation and first secondary pump radiation. In this way, the efficiency increase is used and high intensity second converter light may be obtained. Further, tunability of the lighting device light may also be increased.

The lighting device light may be relatively depleted in red light. Hence, an additional red light source may be added. The light of this light source may have a substantially completely separate path. However, optionally the light source light of the additional light source may also be provided to one or more luminescent concentrators (but without substantial conversion by the respective luminescent concentrator). This may e.g. reduce the thickness of the lighting device. Hence, in embodiments the lighting device may further comprise a second lighting device configured to generate (red) second lighting device light and configured to provide said second lighting device light at one or more of (a) a first face of said first luminescent concentrator and (b) a first face of said second luminescent concentrator. The (red) second lighting device light may escape from the radiation exit window, together with the luminescent material light/converter light. When a third luminescent concentrator is applied, alternatively or additionally the second lighting device may be configured to provide said second lighting device light at one or more of (a) a first face of said first luminescent concentrator, (b) a first face of said second luminescent concentrator, and (c) a first face of said third luminescent concentrator. Hence, in embodiments one or more of the first luminescent concentrator, the second luminescent concentrator, and the (optional) third luminescent concentrator may radiationally be coupled with one or more second lighting devices.

As indicated above, the lighting device may further comprise a third luminescent concentrator. Hence, in embodiments the lighting device (thus) further comprises a third luminescent concentrator configured parallel to the second luminescent concentrator with a side edge of the second luminescent concentrator configured parallel to a side edge of the third luminescent concentrator, wherein the third luminescent concentrator is configured to receive at said side edge of the third luminescent concentrator one or more of said first pump radiation, said first luminescent material light, and said second luminescent material light escaping from said side edge of said second luminescent concentrator as third pump radiation, the third luminescent concentrator comprising a third luminescent material configured to convert at least part of the third pump radiation into third luminescent material light, and configured to couple at least part of the third luminescent material light out at the third radiation exit window as third converter light.

Therefore, third luminescent concentrator is especially configured parallel to the second luminescent concentrator with a side edge of the second luminescent concentrator configured parallel to a side edge of the third luminescent concentrator. The third luminescent concentrator is configured to receive at said side edge of the third luminescent concentrator one or more of said second pump radiation and said second luminescent material light escaping from said side edge of said second luminescent concentrator. The one or more of said second pump radiation and said second luminescent material light escaping from said side edge of said second luminescent concentrator are herein indicated as third pump radiation. Whether or not second pump radiation is available downstream of the second luminescent concentrator may amongst others depend upon the thickness of second the luminescent concentrator and the oscillator strength of the absorption or excitation of the second luminescent material comprised by the second luminescent concentrator. The third luminescent concentrator is thus especially radiationally coupled with the second luminescent concentrator. Optionally, the third luminescent concentrator is also radiationally coupled with the first luminescent concentrator. The third luminescent concentrator comprises thus a third luminescent material configured to convert at least part of the third pump radiation into third luminescent material light. The third luminescent concentrator is configured to couple at least part of the third luminescent material light out at the third radiation exit window as third converter light. The term "third luminescent material" may also refer to a plurality of different third luminescent materials. Further, the term "third luminescent concentrator" may also refer to a plurality of different third luminescent concentrators. Below, some examples of luminescent materials are provided.

In embodiments, the plurality of light sources are configured to provide UV light source radiation as first pump radiation, the first luminescent material is configured to convert at least part of the first pump radiation into blue first luminescent material light, the second luminescent material is configured to convert at least part of the second pump radiation into one or more of green second luminescent material light and yellow second luminescent material light, and the third luminescent concentrator is configured to convert at least part of the third pump radiation into red third luminescent material light.

Now, first pump radiation may or may not reach the second luminescent concentrator. Likewise, second pump radiation may or may not reach the third luminescent concentrator. When first pump radiation reaches the second luminescent concentrator, the first pump radiation may or may not be transmitted through the second luminescent concentrator and may or may not reach the third luminescent concentrator. Likewise, first luminescent material light will reach the second luminescent concentrator but may or may not be transmitted through the second luminescent concentrator and may or may not reach the third luminescent concentrator. Different configurations may be chosen, dependent upon the material properties and the desired lighting device light, etc.

Hence, in embodiments one or more of the following applies: (a) the first luminescent concentrator is configured to transmit at least part of the light source radiation, and the second pump radiation (thus) comprises at least part of said light source radiation transmitted by said first luminescent concentrator; and (b) the second luminescent concentrator is configured to transmit at least part of one or more of said light source radiation and said first luminescent material light, and wherein the third pump radiation comprises at least part of one or more of said light source radiation transmitted by said second luminescent concentrator and said first luminescent material light transmitted by said second luminescent concentrator. Both may apply, or only one of these may apply, and in some embodiments none of these may apply.

As indicated above, the lighting device light may be relatively depleted in red light. Hence, an additional red light source may be added. This light source may have a substantially completely separate path. However, optionally the light source light of the additional light source may also be provided to one or more luminescent concentrators. Hence, in embodiments the lighting device further comprises a second lighting device configured to generate red second lighting device light and configured to provide said second lighting device light at one or more of a first face of said first luminescent concentrator, a first face of said second luminescent concentrator, and a first face of said third luminescent concentrator. Hence, in embodiments one or more of the first luminescent concentrator, the second luminescent concentrator and the optional third luminescent concentrator may radiationally be coupled with one or more second lighting devices.

The third luminescent concentrator may essentially be pumped via the second luminescent concentrator only (i.e. the second pump radiation being transmitted through the second luminescent concentrator and/or the second luminescent material light). However, in yet other embodiments, in addition to this pumping mechanism, the third luminescent concentrator may also be pumped directly. Hence, in embodiments the lighting device further comprises a plurality of second light sources configured to generate second light source light as first secondary pump radiation to the one or more radiation input faces of one or more of (a) the second luminescent concentrator, wherein the second luminescent concentrator comprises said second luminescent material configured to convert at least part of the first secondary pump radiation into said second luminescent material light, and (b) the third luminescent concentrator, wherein the third luminescent concentrator comprises said third luminescent material configured to convert at least part of the first secondary pump radiation into said third luminescent material light. As indicated above, the third luminescent concentrator is configured to couple at least part of the third luminescent material light out at the third radiation exit window as third converter light, and this third converter light may thus be the conversion result of third pump radiation and second first secondary pump radiation. In this way, the efficiency increase is used and high intensity third converter light may be obtained. Further, tunability of the lighting device light may also be increased. Note that optionally different types of second light sources may be applied, such as a subset configured to directly pump the second luminescent concentrator and a subset configured to directly pump the third luminescent concentrator. In yet other embodiments, only the second luminescent concentrator and/or only the third luminescent concentrator is directly pumped with second light source light (in addition to the indirect pumping via the first luminescent concentrator and second luminescent concentrator, respectively). Hence, in embodiments the third (and optionally one or more of the first and second) luminescent concentrator may thus radiationally be coupled with the second light sources.

Further tunability can be increased when the first light sources comprise two or more subsets with (substantially) different spectra distributions. Assuming solid state light sources, especially the two or more subsets are in different bins. Hence, in contrast to the embodiment above, in embodiments two or more subsets of light sources are in different bins, especially having emission maxima ("peak maxima"), having differences of at least 5 nm, such as especially at least 8 nm, even more especially at least 10 nm, such as e.g. a subset configured to provide blue light and a subset configured to generate UV radiation. As in general the first luminescent material and the second luminescent material (the latter pumped via the first luminescent concentrator) may have different excitation oscillator strength ratio's of blue/UV radiation, tunability can be increased. Hence, in embodiments the plurality of light sources comprise a first subset of light sources configured to provide first subset light source light and a second subset of light sources configured to provide second subset light source light, the first subset light source light and the second subset light source light having different spectral distributions and wherein two or more of the luminescent materials have mutually different excitation oscillator strength ratios for the first subset light source light and the second subset light source light.

The oscillator strength ratios may e.g. be selected from the range of at least 1.02, such as at least 1.1, like in the range of 1.02-1000, such as in the range of 1.1-1000, like 1.5-1000. The differences between the ratios may also be defined as ratios, and may especially be selected from the range of at least 1.02, such as at least 1.1, like in the range of 1.02-1000, such as in the range of 1.1-1000, like 1.5-1000. For instance, a first luminescent material may have a ratio of blue/UV excitation oscillator strengths of 0.5, a second luminescent material may have a ratio of blue/UV excitation oscillator strength of 2. Then for determining the extend of the difference, the larger ratio may be divided by the smaller, leading to a ratio of the blue/UV excitation oscillator strength ratios of 4.

As will be clear to a person skilled in the art, the lighting device may further comprise or may functionally be coupled with a control system. The control system may be configured to control the light sources, especially to control two or more light sources independently. In specific embodiments, the control system may be configured to control the two (or more) subsets independently. The terms "control" or "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. Herein, thus especially the intensity of the light source light of the respective light source or subset of light sources may be controlled (i.e. varying the intensity dependent upon the desired spectral distribution of the lighting device light).

Though in principle each light concentrator may be different, there are some general aspects that may apply to all light concentrators. These are herein elucidated below.

The term "light concentrator" is herein used, as a plurality of light sources irradiate a relative large surface (area) of the light converter, and a lot of converter light escapes from a relatively small area (exit window) of the light converter. Thereby, the specific configuration of the light converter provides its light concentrator properties. Each light concentrator may provide Stokes-shifted light, which is Stokes shifted relative to the pump radiation. Each light concentrator comprises a light transmissive body. The light concentrators are especially described in relation to an elongated light transmissive body, such as a ceramic rod. However, these aspects may also be relevant for other shaped ceramic bodies. The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of visible light in a direction perpendicular to the length of the light transmissive body. Without the activator such as trivalent cerium, the transmission in the visible might be close to 100%, such as at least 95%, like even at least 99%, such as even at least 99.5%.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam like or rod like, however especially beam like (cuboid like). However, the light transmissive body may also be disk like, etc. The invention is not limited to specific embodiments of shapes, neither is the invention limited to embodiments with a single exit window or outcoupling face. Below, some specific embodiments are described in more detail. Would the light transmissive body have a circular cross-section, then the width and height may be equal (and may be defined as diameter). Especially, however, the light transmissive body has a cuboid like shape and is further configured to provide a single exit window.

In a specific embodiment, the light transmissive body may especially have an aspect ratio larger than 1, i.e. the length is larger than the width. In general, the light transmissive body is a rod or bar (beam), though the light transmissive body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the light transmissive body. Physical contact may lead to undesired outcoupling and thus a reduction in concentrator efficiency. Further, in general the light transmissive body comprises two substantially parallel faces, the radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive or digital projectors, a small but high intense emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high intensity may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon. Generally the ceramic bodies are cuboid, but may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, such as 10-20 cm.

Especially, the light transmissive body has a width (W) selected to absorb more than 95% of the light source radiation. In embodiments, the light transmissive body has a width (W) selected from the range of 0.05-4 cm, especially 0.1-2 cm, such as 0.2-1.5 cm. With the herein indicated cerium concentration, such width is enough to absorb substantially all light generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heat sinks. The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting device further comprises a reflector configured to reflect luminescent material light back into the light transmissive body. Therefore, the lighting device may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting device further comprises an optical reflector (at least) configured downstream of the first face and configured to reflect light back into the elongated light transmissive body. Alternatively or additionally, optical reflectors may also be arranged at other faces and/or parts of faces that are not used to couple light source radiation in or luminescence light out. Especially, such optical reflectors may not be in physical contact with the light transmissive body. Further, such optical reflector(s) may be configured to reflect one or more of the luminescence and light source radiation back into the light transmissive body. Hence, substantially all light source radiation may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of non-red light in the converter light (downstream of the radiation exit window). For filtering out light source radiation, optionally an interference filter may be applied. Likewise this may apply to another color, when a color other than green and red is desired.

In yet a further embodiment, the lighting device further comprises a collimator configured downstream of the radiation exit window and configured to collimate the converter light. Such collimator, like e.g. a CPC (compound parabolic concentrator), may be used to collimate the light escaping from the radiation exit window and to provide a collimated beam of light. Further, the lighting device may include a heat sink configured to facilitate cooling of the solid state light source and/or luminescent concentrator. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. The lighting device may further include one or more cooling elements configured to cool the light transmissive body.

Especially, the light sources are light sources that during operation emit (light source radiation) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state LED light source (such as a LED or laser diode). The term "light source" may also relate to a plurality of light sources, such as e.g. 2-20 (solid state) LED light sources, though many more light sources may be applied. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body.

Note that above indicated dimensions like length, ratio, etc., may thus differ for each light concentrator, though in embodiments the first light concentrators may all be substantially identical. Hence, in embodiments the plurality of first luminescent concentrators includes two or more subsets of first luminescent concentrators having different lengths (L). In yet further embodiments, the plurality of first luminescent concentrators all substantially have identical lengths (L). In embodiments, the length (L) is selected from the range of 10-500 mm. This may thus apply to all luminescent concentrators. However, the range indicates that the different luminescent concentrators may have different lengths within this range.

Hence, as indicated above in specific embodiments, however, the lengths may be different. For instance, assuming two luminescent concentrators, one may be longer than the other. The part of the longer luminescent concentrator that is extending relative to the other, may be used to pump with light source light. This may lead to lighting device light essentially based on the luminescent material comprised by the longer luminescent concentrator. Likewise, assuming three luminescent concentrators, one of them may be longer than the other two. However, in other embodiments all three may have different lengths. The longest may be used to provide essentially lighting device light based on the luminescent material light comprised by the longest luminescent concentrator. Dependent upon the position of the light sources and/or the excitability of the luminescent material light comprised by the luminescent concentrator having intermediate length, pumping the part extending relative to the shortest luminescent concentrator may provide lighting device light essentially based on the luminescent material comprised by the intermediate length luminescent concentrator, and optionally also (some) luminescent material light of the longest luminescent concentrator. Therefore, the invention also provides one or more of the luminescent concentrators being longer than one or more of the other luminescent concentrators, thereby providing one or more luminescent concentrator extending parts extending relative to the one or more other luminescent concentrators, and wherein a subset of the light sources is configured to provide light source radiation to the one or more luminescent concentrator extending parts. For instance, the luminescent concentrators may have ratio(s) of the lengths of at least 1.1, like at least 1.2, such as in the range of 1.2-10, like 1.5-6. In general, the ratios may be in the range of 1.05-2. Further, especially the largest luminescent concentrator and shortest luminescent concentrator do not differ more in length than 50% of the length of the largest luminescent concentrator.

The terms "first luminescent concentrator", "second luminescent concentrator", and similar terms, may independently also refer to a plurality of first luminescent concentrators, second luminescent concentrators, etc. Hence, for instance in embodiments two first luminescent concentrators may be configured parallel and adjacent and having (essentially) identical lengths (as they are first luminescent concentrators), and one or more second luminescent concentrators may be configured parallel and adjacent to one or more first luminescent concentrators, the second luminescent concentrators having (essentially) identical lengths (as they are first luminescent concentrators), wherein over the luminescent concentrator extending parts the first luminescent concentrators might receive light from each other, but wherein over the luminescent concentrator extending part(s) length essentially no light may escape to the second luminescent concentrator(s) as they are not configured parallel over this luminescent concentrator extending part(s) length. Hence, when there are more than two luminescent concentrators, there may be two or more subsets of one or more luminescent concentrators having identical lengths within the subset but differing from luminescent concentrator lengths of luminescent concentrators of one or more other subsets.

In yet further embodiments, the elongated light transmissive body of one or more luminescent concentrators comprise an elongated ceramic body. Luminescent ceramic garnets doped with $Ce^{3+}$ (trivalent cerium) can be used to convert blue light into light with a longer wavelength, e.g. within the green to red wavelength region, such as in the range of about 500-750 nm. To obtain sufficient absorption and light output in desired directions, it is advantageous to use transparent rods (especially substantially shaped as beams). Such rod can be used as light concentrator, concentrating over their length light source radiation from light sources such as LEDs (light emitting diodes), converting this light source radiation into converter light and providing at an exit surface a substantial amount of converter light. Lighting devices based on light concentrators may e.g. be of interest for projector applications. For projectors, red and green luminescent concentrators are of interest. Green luminescent rods, based on garnets, can be relatively efficient. Such concentrators are especially based on YAG:Ce (i.e. $Y_3Al_5O_{12}:Ce^{3+}$) or LuAG ($Lu_3Al_5O_{12}:Ce^{3+}$). 'Red' garnets can be made by doping a YAG-garnet with Gd ("YGdAG"). Doping of Gd, however, results in a lower thermal stability (thermal quenching). Red-shifting can also be obtained using a high Ce concentration, with a much smaller penalty for thermal stability. For obtaining blue light phosphors such as, for example, BAM:Eu, YSO:Ce, GYSO:Ce, LYSO:Ce, BGO:Bi, $CaF_2$:Eu and/or Eu-doped glass may for example be used. For obtaining green light phosphors such as, for example, LuAG LuGaAG:Ce, and/or GaYAG:Ce may for example be used. For obtaining yellow light phosphors such as, for example, YAG:Ce and/or YGdAG:Ce may for example be used. For obtaining red light phosphors such as, for example, $Ba_3SiO_5$:Eu, SrO:Eu, CaS:Eu, $SrLi_2Si_2N_4$:Eu, $Mg_3Gd_2(Ge_3)_{12}$:Ce, $Mg_3Gd_2Ge_2SiO_{12}$:Ce $Y_3Al_5O_{12}$:V,Ca and/or $YALO_3$:V,Ca may for example be used.

Hence, especially the elongated light transmissive body comprises a ceramic material configured to wavelength convert at least part of the (blue) light source radiation into converter light in the red, which converter light at least partly escapes from the radiation exit window. The ceramic material especially comprises an $A_3B_5O_{12}$:$Ce^{3+}$ ceramic material ("ceramic garnet"), wherein A comprises yttrium (Y) and gadolinium (Gd), and wherein B comprises aluminum (Al). As further indicated below, A may also refer to other rare earth elements and B may include Al only, but may optionally also include gallium. The formula $A_3B_5O_{12}$:$Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises said radiation exit window, wherein the elongated light transmissive body comprises a ceramic material configured to wavelength convert at least part of (blue) light source radiation into converter light, such as (at least) red converter light (which at least partly escapes from the radiation exit window when the elongated light transmissive body is irradiated with blue light source radiation), wherein the ceramic material comprises an $A_3B_5O_{12}$:$Ce^{3+}$ ceramic material as defined herein. Such light transmissive body can thus be used as light converter. Especially, such light transmissive body has the shape of a cuboid.

As indicated above, the ceramic material comprises a garnet material. Hence, the elongated body especially comprises a luminescent ceramic. The garnet material, especially the ceramic garnet material, is herein also indicated as "luminescent material". The luminescent material comprises an $A_3B_5O_{12}$:$Ce^{3+}$ (garnet material), wherein A is especially selected from the group consisting of Sc, Y, Tb, Gd, and Lu (especially at least Y and Gd), wherein B is especially selected from the group consisting of Al and Ga (especially at least Al). More especially, A (essentially) comprises yttrium (Y) and gadolinium (Gd), and B (essentially) comprises aluminum (Al). Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.005-0.035. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

After obtaining the light transmissive body, the body may be polished. Before or after polishing an annealing process (in an oxidative atmosphere) may be executed, especially before polishing. In a further specific embodiment, said annealing process lasts for at least 2 hours, such as at least 2 hours at at least 1200° C. Further, especially the oxidizing atmosphere comprises for example $O_2$.

Instead of cerium doped garnets, or in addition to such garnets, also other luminescent materials may be applied, e.g. embedded in organic or inorganic light transmissive matrixes, as luminescent concentrator. For instance quantum dots and/or organic dyes may be applied and may be embedded in transmissive matrices like e.g. polymers, like PMMA, or polysiloxanes, etc. etc. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphode (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content. Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD back-lighting, etc.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein and optionally one or more second lighting devices configured to provide second lighting device light, wherein the lighting system light comprises (a) one or more of (i) said second converter light as defined herein and (ii) said third converter light as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein.

Hence, amongst others a lighting device is provided comprising a first luminescent concentrator further using a second luminescent material of another composition alongside the first luminescent concentrator (especially no optical contact and/or optically separated using a dichroic mirror). Especially, this second material has an absorption band overlapping with the emission band of the first material. As a consequence a (significant) part of the light generated by the first luminescent material will be absorbed by the second material resulting in a high brightness white source with increased efficiency. The luminescent concentrators may have essentially identical length and be configured alongside each other over essentially the entire length(s), or two or more may have different lengths, wherein over part of a length of a luminescent concentrator alongside no luminescent concentrator may be configured.

Further, the plurality of light sources may in embodiments comprise a first subset of light sources configured to provide first subset light source light and a second subset of light sources configured to provide second subset light source light, the first subset light source light and the second subset light source light having different spectral distributions, and the luminescent materials of the two or more luminescent concentrators being different, the lighting device light may (further) be controlled, by controlling the subsets of light sources. With controlling the intensity of the light source light of the light sources of the subsets, different spectral distributions of the lighting device light may be provided. When using different luminescent materials, they will especially have mutually different excitation oscillator strength ratios for the light source light of the different light sources (of the different subsets).

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 7a-7f schematically depict yet some further embodiments of possible stacks. The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
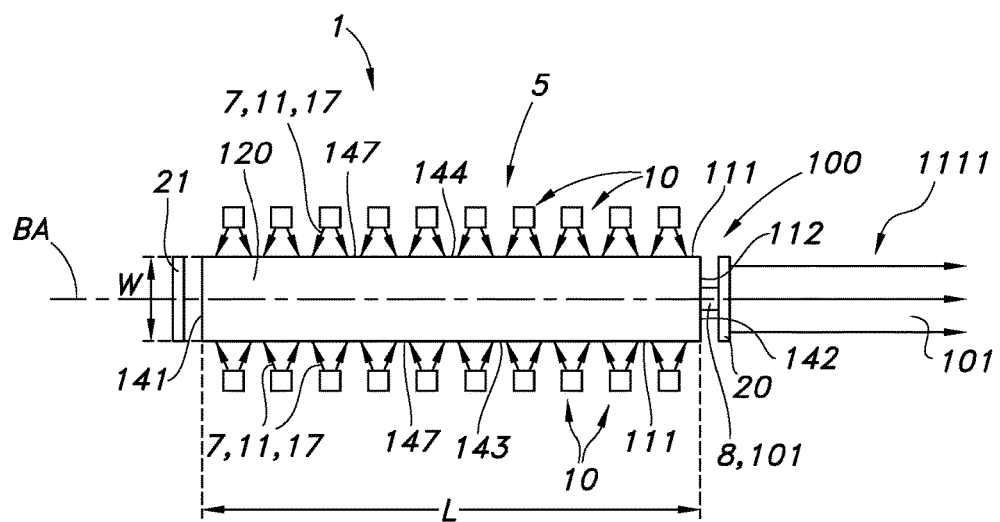
FIGS. 1a-1e schematically depict some aspects of the invention.

An embodiment of the lighting device as defined herein is schematically depicted in FIG. 1a. FIG. 1a schematically depicts a lighting device 1 comprising a plurality of solid state light sources 10 and a luminescent concentrator 5 comprising an elongated light transmissive body 100 having a first face 141 and a second face 142 ("nose of the rod") defining a length L of the elongated light transmissive body 100. The elongated light transmissive body 100, especially a ceramic body, comprising one or more radiation input faces 111, here by way of example two oppositely arranged faces, indicated with references 143 and 144 (which define e.g. the width W), which are herein also indicated as edge faces or edge sides 147. Further the light transmissive body 100 comprises a radiation exit window 112, wherein the second face 142 comprises said radiation exit window 112. The entire second face 142 may be used or configured as radiation exit window. The plurality of solid state light sources 10 are configured to provide (blue) light source radiation 11 to the one or more radiation input faces 111. As indicated above, they especially are configured to provide to at least one of the radiation input faces 111 a blue power $W_{opt}$ of in average at least 0.067 Watt/mm$^2$. Reference BA indicates a body axis, which will in cuboid embodiments be substantially parallel to the edge sides 147.

The elongated light transmissive body 100 comprises a ceramic material 120 configured to wavelength convert at least part of the (blue) light source radiation 11 into converter light 101, such as at least one or more of green and red converter light 101. As indicated above the ceramic material 120 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used.

The light sources may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source radiation in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source radiation 11, which is used as pump radiation 7. Reference 17 is used to indicate this pump radiation 7 as first pump radiation 17. The luminescent material 120 converts the light source radiation into luminescent material light 8. Light escaping at the light exit window is indicated as converter light 101, and will include luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material.

Light generated by the lighting device 1 (during operation of such lighting device) is indicated with reference 1111. This lighting device light or "device light" comprises at least converter light 101 and optionally also light source light 11 (here pump radiation 7).

Figure 1B:
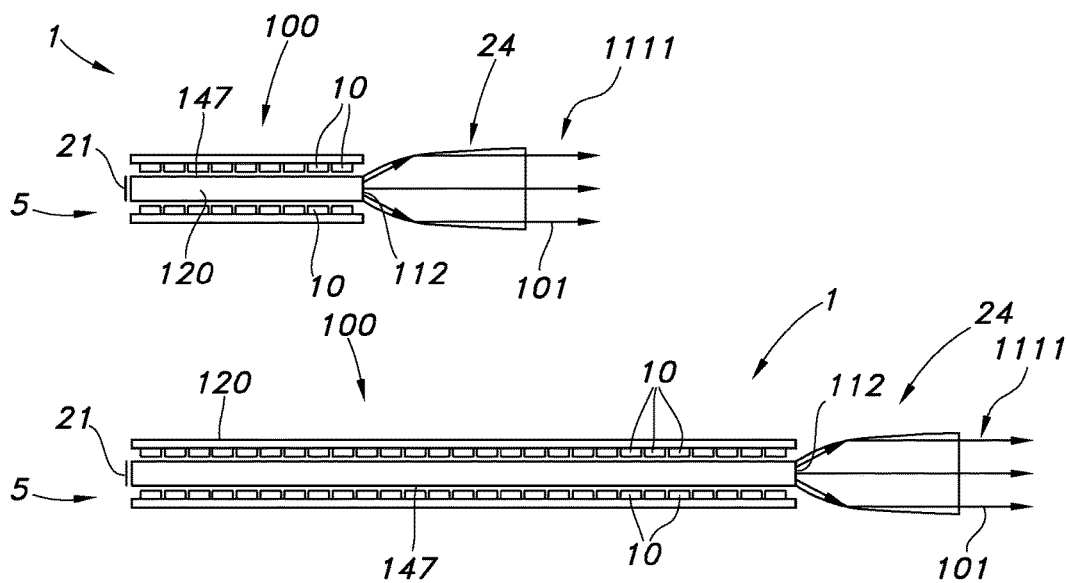

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 24, such as a CPC.

Figure 1C:
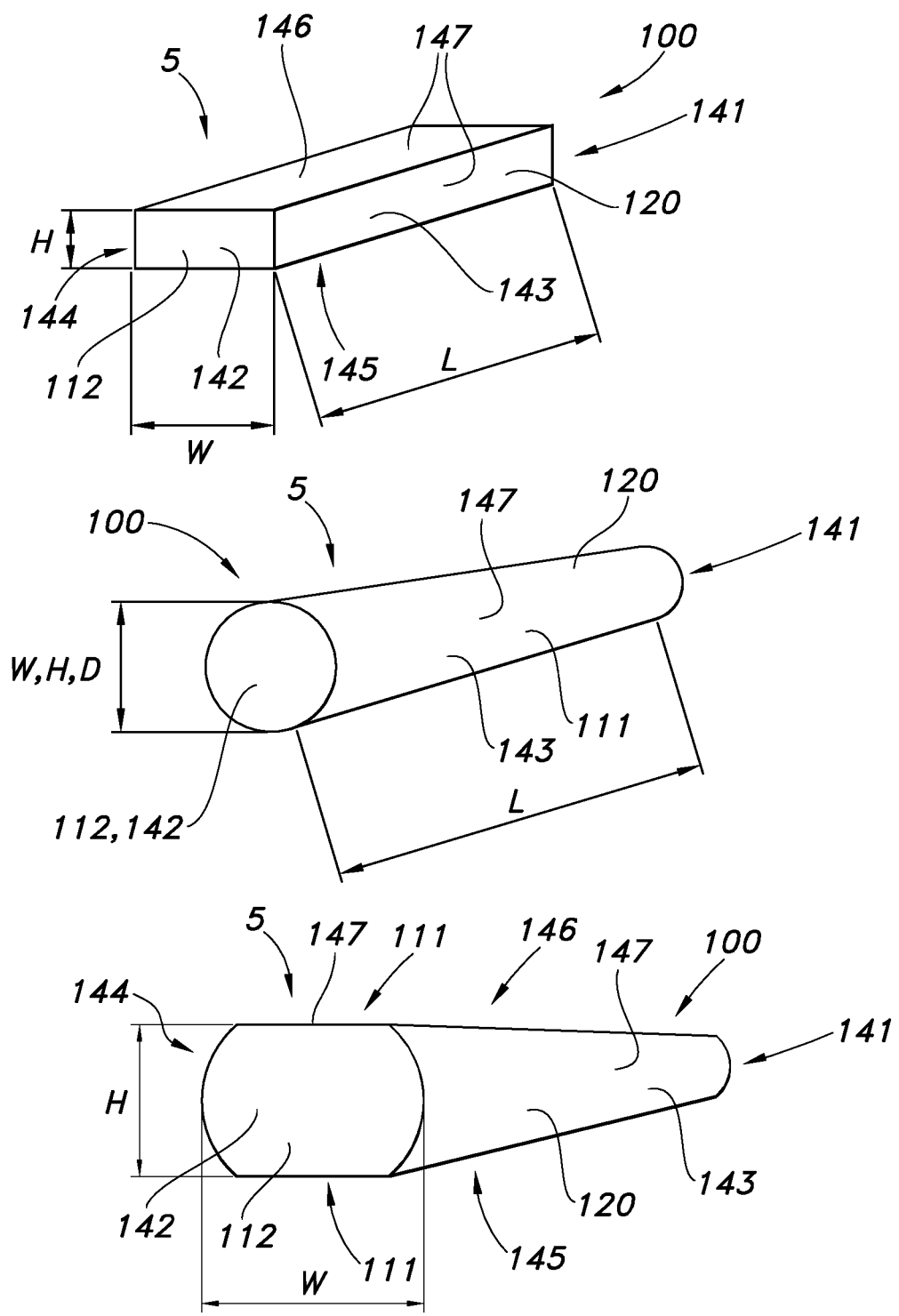

FIG. 1c schematically depicts some embodiments of possible ceramic bodies as waveguides or luminescent concentrators. The faces are indicated with references 141-146. The first variant, a plate-like or beam-like light transmissive body has the faces 141-146. Light sources, which are not shown, may be arranged at one or more of the faces 143-146. The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces. The variants shown in FIG. 1c are not limitative. More shapes are possible; i.e. for instance referred to WO2006/054203, which is incorporated herein by reference. The ceramic bodies, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments<10 mm, in other embodiments<5 mm, in yet other embodiments<2 mm. The width W is in embodiments<10 mm, in other embodiments<5 mm, in yet embodiments<2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-100, such as 10-60, like 10-20. Unless indicated otherwise, the term "aspect ratio" refers to the ratio length/width.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Figure 1D:
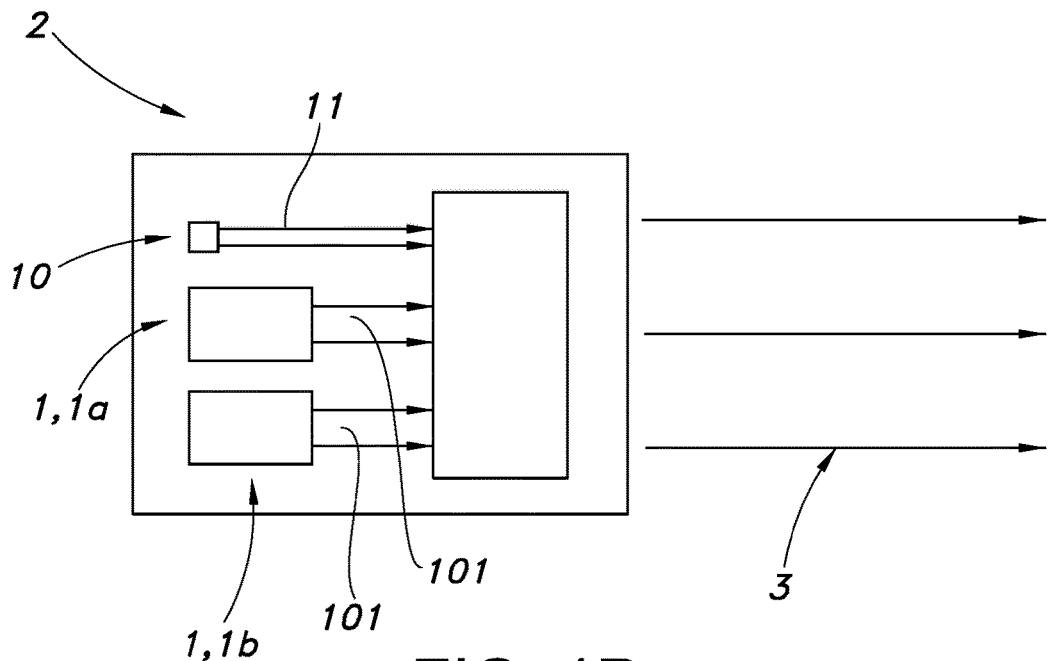

FIG. 1d very schematically depicts a projector or projector device 2 comprising the lighting device 1 as defined herein. By way of example, here the projector 2 comprises at least two lighting devices 1, wherein a first lighting device (1a) is configured to provide e.g. green light 101 and wherein a second lighting device (1b) is configured to provide e.g. red light 101. Light source 10 is e.g. configured to provide blue light. These light sources may be used to provide the projection 3. Note that the additional light source 10, configured to provide light source radiation 11, is not necessarily the same light source as used for pumping the luminescent concentrator(s). Further, here the term "light source" may also refer to a plurality of different light sources.

High brightness light sources are interesting for various applications including spots, stage-lighting, headlamps and digital light projection.

Figure 1E:
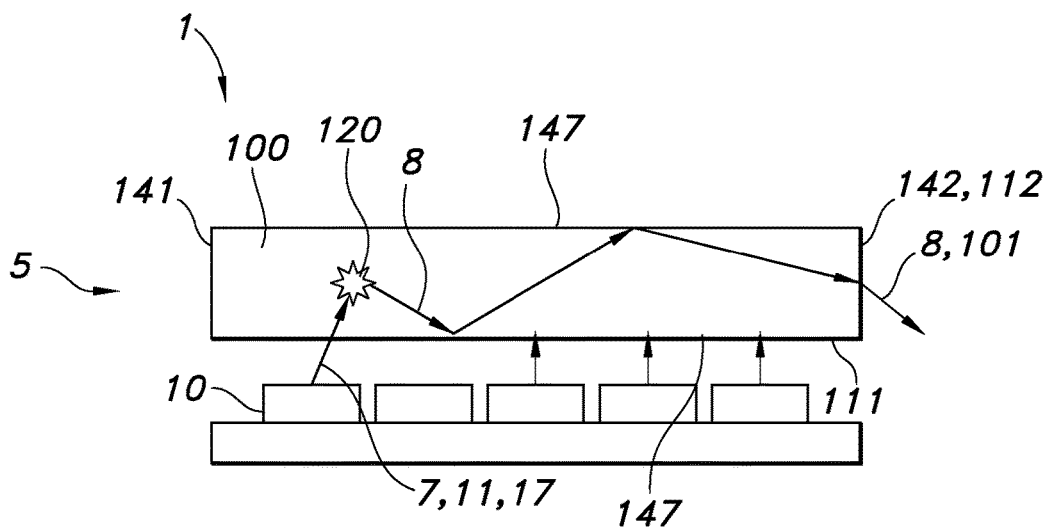

For this purpose, it is possible to make use of so-called light concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 1e).

Figure 2A:
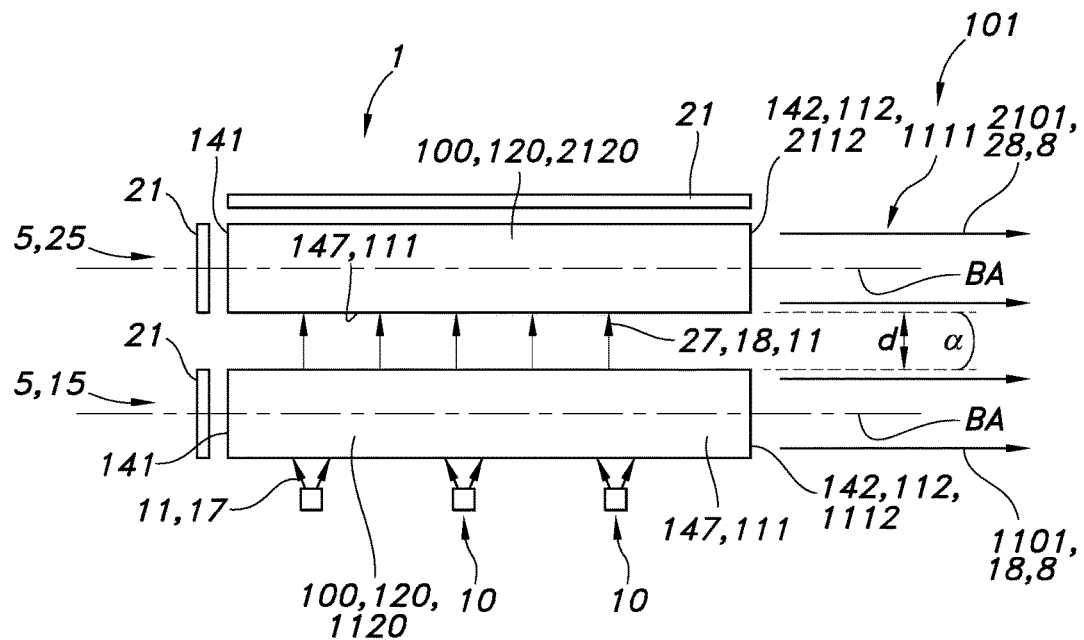
FIGS. 2a-2b schematically depict some embodiments.
Figure 2B:
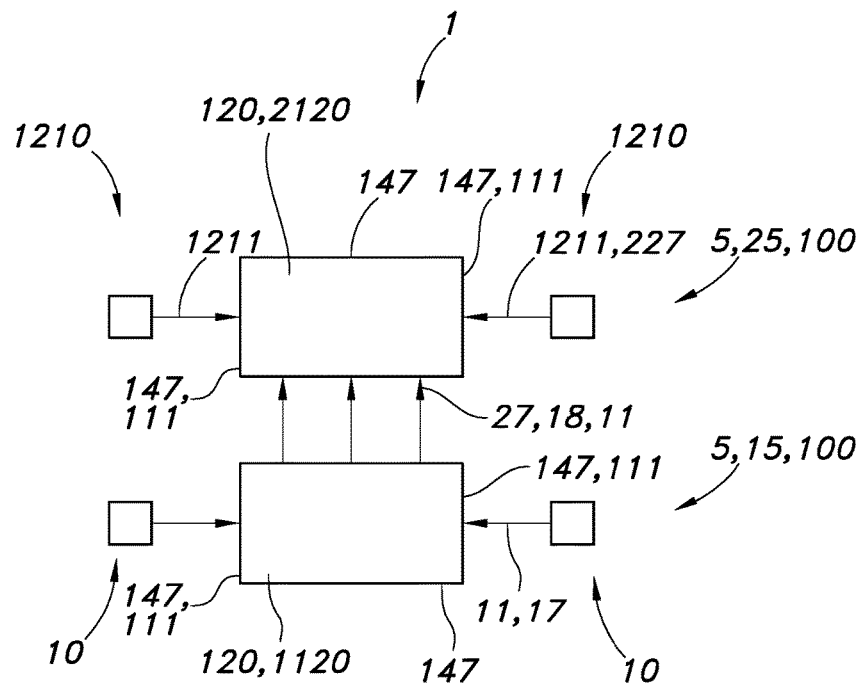

FIGS. 2a-2b schematically depict an embodiment 1 of the lighting device 1 comprising a plurality of luminescent concentrators 5 as described above. Further, the lighting device 1 comprises a plurality of light sources 10 configured to provide light source radiation 11 as first pump radiation 17 to the one or more radiation input faces 111 of a first luminescent concentrator 15. FIGS. 2a-2b and some other figures schematically depict embodiments wherein the luminescent concentrators have essentially identical lengths.

This first luminescent concentrator 15 comprises a first luminescent material 1120 configured to convert at least part of the first pump radiation 17, received at one or more radiation input faces 111, into first luminescent material light 18, and configured to couple at least part of the first luminescent material light 18 out at the first radiation exit window 1112 as first converter light 1101. Reference 1101 indicates that this converter light is converter light 101 of the first luminescent converter 1100.

The lighting device 1 further comprises a second luminescent concentrator 25 configured parallel to the first luminescent concentrator 15 with a side edge 147 of the first luminescent concentrator 15 configured parallel to a side edge 147 of the second luminescent concentrator 25. The second luminescent concentrator 25 is configured to receive at said side edge 147 of the second luminescent concentrator 25 one or more of said first pump radiation 17 and said first luminescent material light 18 escaping from said side edge 147 of said first luminescent concentrator 15, i.e. second pump radiation 27. Further, the second luminescent concentrator 25 comprises a second luminescent material 2120 configured to convert at least part of the second pump radiation 27 into second luminescent material light 28. Further, the second luminescent concentrator 25 is configured to couple at least part of the second luminescent material light 28 out at the second radiation exit window 2112 as second converter light 2101. Said first converter light 1101 and said second converter light 2101 are comprised by the lighting device light 101.

In embodiments, the first luminescent concentrator 15 is configured to transmit at least part of the light source radiation 11, and the second pump radiation 27 comprises at least part of said light source radiation 11 transmitted by said first luminescent concentrator 15. Hence, the arrow indicating second pump light 28 will include first luminescent material light 18 and in such embodiments also first light source light 11. The distance between the luminescent concentrators is indicated with reference d. Here, the body axis and the upper and lower side edges 147 have an angle α being substantially zero.

FIG. 2b schematically shows a cross-sectional view of the embodiment schematically depicted in FIG. 2a, but including a variant with additional pumping light sources for pumping the second luminescent converter 25 directly. The lighting device 1 further comprises a plurality of second light sources 1210 configured to generate second light source light 1211 as first secondary pump radiation 227 to the one or more radiation input faces 111 of the second luminescent concentrator 25. The second luminescent concentrator 25 comprises said second luminescent material 2120 configured to convert (also) at least part of the first secondary pump radiation 227, received at one or more radiation input faces 111, into said second luminescent material light 28. Further, the second luminescent converter 250 is configured to couple at least part of the second luminescent material light 28 out at the second radiation exit window 2112 as second converter light 2101.

Ref. 21 indicates a reflector, which can be arranged at an end opposite of the radiation exit window 112, and or which can be arranged parallel to a side edge 147 which may e.g. not be used for incoupling of light of a light source or outcoupling of light to an adjacent luminescent concentrator.

The reflector 21 in FIG. 2a can be used to reflect useful light back into the second luminescent concentrator 25. Alternatively or additionally, a reflector may be arranged at an edge of the first luminescent concentrator. For instance, referring to FIG. 2b would a reflector be arranged at the edge depicted lowest in the schematic drawing (see ref 147 to the horizontal drawn edge of the first luminescent concentrator 15), such reflector may be used to reflect light back into the first luminescent concentrator, which may optionally ultimately also reach the second luminescent concentrator 25, for conversion therein. Such embodiments may be used alternative to the embodiment schematically depicted in FIG. 6a (middle embodiment).

In analogy to FIGS. 2a-2b, FIGS. 3a-3b schematically depict embodiments and variants with a third luminescent concentrator 35. Here, the lighting device 1 further comprises thus a third luminescent concentrator 35 configured parallel to the second luminescent concentrator 25 with a side edge 147 of the second luminescent concentrator 25 configured parallel to a side edge 147 of the third luminescent concentrator 35. The third luminescent concentrator 35 is configured to receive at said side edge 147 of the third luminescent concentrator 35 one or more of said first pump radiation 17, said first luminescent material light 18, and said second luminescent material light 28 escaping from said side edge 147 of said second luminescent concentrator 25 as third pump radiation 37. The third luminescent concentrator 35 comprises a third luminescent material 3120 configured to convert at least part of the third pump radiation 37 into third luminescent material light 38, and configured to couple at least part of the third luminescent material light 38 out at the third radiation exit window 3112 as third converter light 3101. Said first converter light 1101, said second converter light 2101, and said third converter light 3101 are comprised by the lighting device light 101. The distance between the luminescent concentrators is indicated with reference d. Here, the body axis and the upper and lower side edges 147 have an angle α being substantially zero. Note that the difference may be different between the first luminescent concentrator and second luminescent concentrator, and the second luminescent concentrator and the third luminescent concentrator.

Here, the first luminescent concentrator is indicated as lower order than the second luminescent concentrator, etc., and the third luminescent concentrator is indicated as higher order than the second and first luminescent concentrator.

Figure 3A:
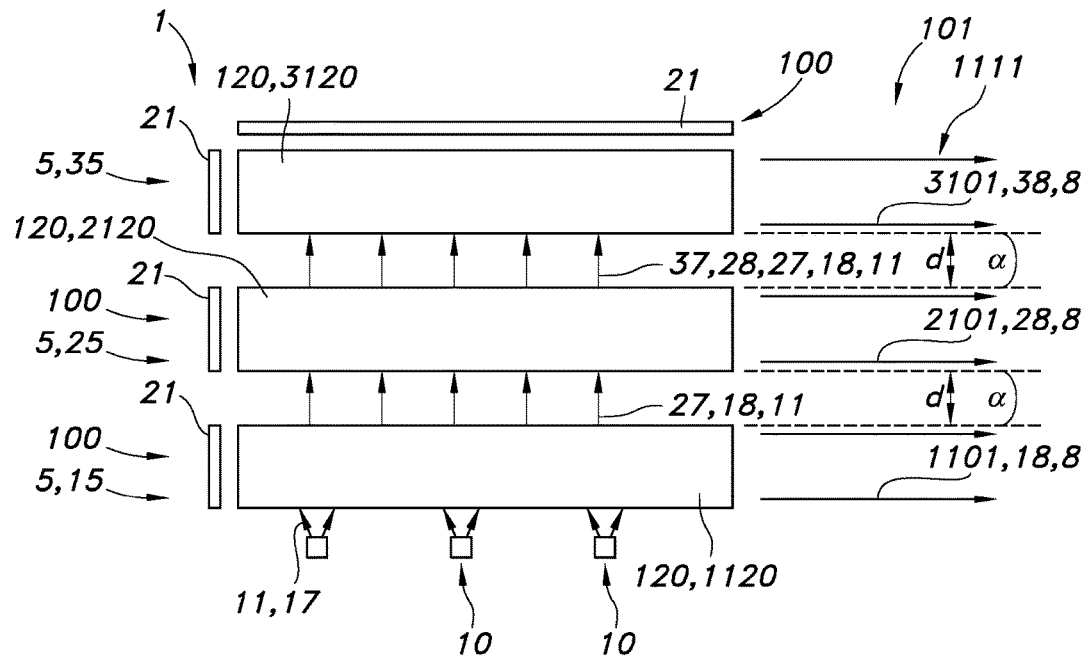
FIGS. 3a-3b schematically depict some further embodiments.
Figure 3B:
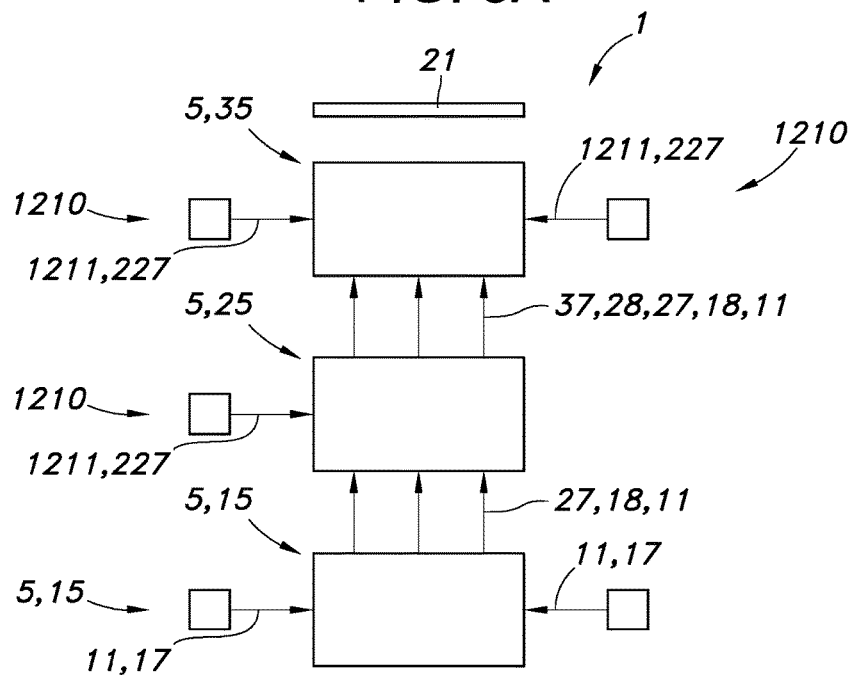

Further, FIG. 3b schematically shows a cross-sectional view of the embodiment schematically depicted in FIG. 3a, but including a variant with additional pumping light sources for pumping the second luminescent converter 25 and/or the third luminescent concentrator 35 directly. The lighting device 1 further comprises a plurality of second light sources 1210 configured to generate second light source light 1211 as first secondary pump radiation 227 to the one or more radiation input faces 111 of the second luminescent concentrator 25 and/or the third luminescent concentrator 35.

Figure 4A:
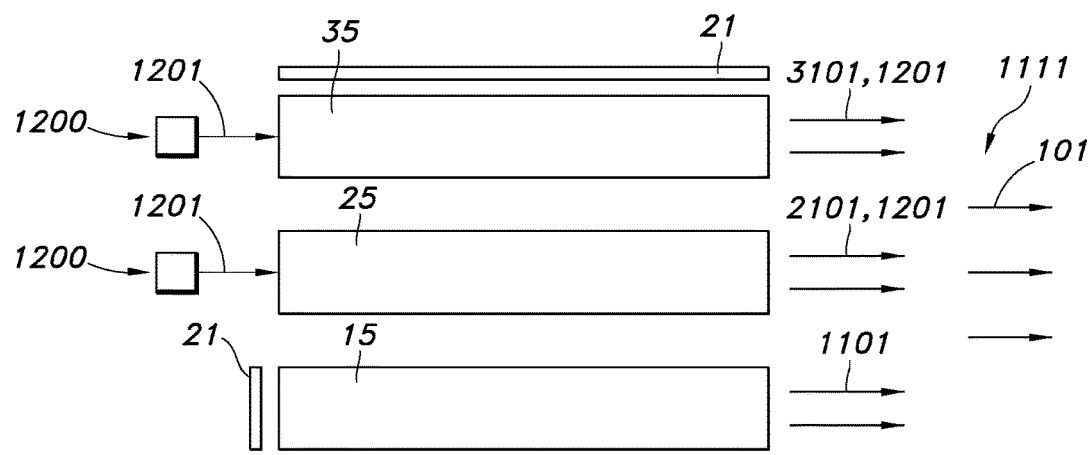
FIGS. 4a-4b schematically depict yet some further embodiments.
Figure 4B:
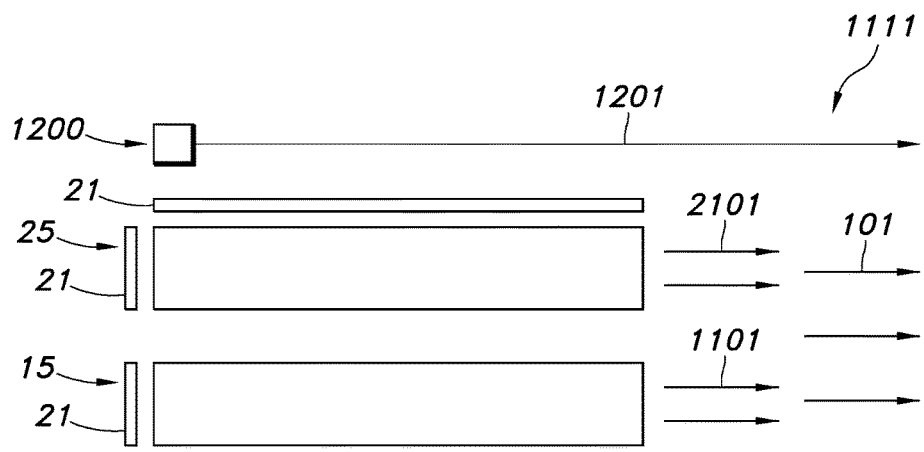

FIG. 4a schematically depicts an embodiment, further comprising a second lighting device 1200 configured to generate second lighting device light 1201, especially red lighting device light 1201, and configured to provide said second lighting device light 1201 at one or more of (a) a first face 141 of said first luminescent concentrator 15, (b) a first face 141 of said second luminescent concentrator 25, and (c) a first face 141 of a third luminescent concentrator 35 (when available). However, also other embodiments are possible. For instance, a second lighting device 1200, such as red LED, can e.g. also be placed at the surfaces 141 or 142 (see FIG. 1c). By wave guiding this light also ends up in the nose output. However, the second lighting device light 1201 may also be provided directly, without coupling in and again out of a luminescent concentrator, see FIG. 4b.

Figure 5A:
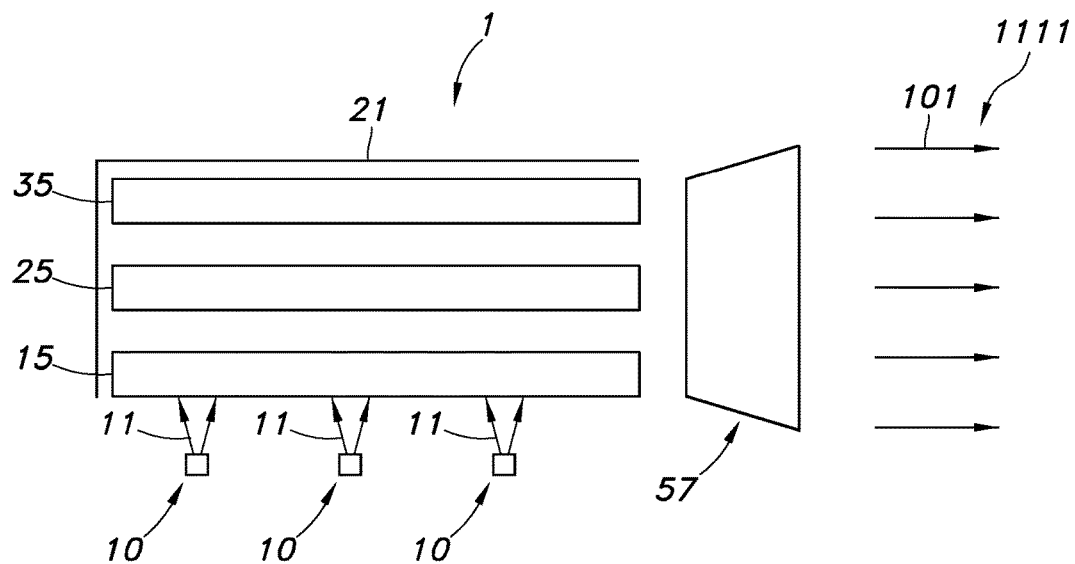
FIGS. 5a-5b schematically depict yet some further embodiments including some additional optics.
Figure 5B:
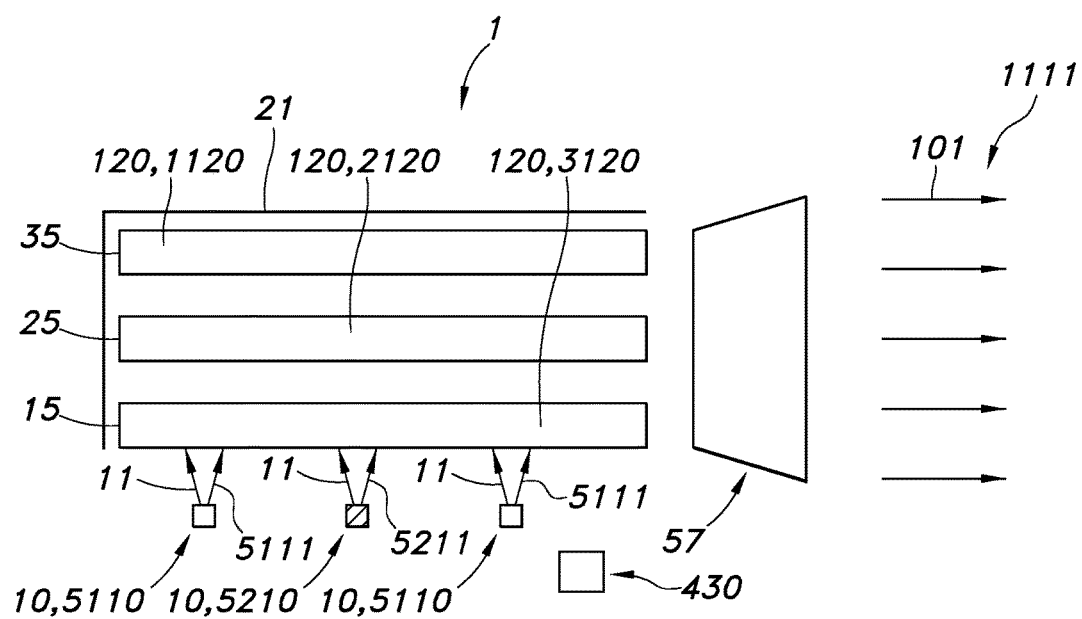

FIGS. 5a-5b schematically depict embodiments of the lighting device including optics 57, such as a collimator, like a CPC (compound parabolic concentrator). Here, by way of example luminescent concentrators 15,25,35 are depicted, but other stacks are also possible, including only first and second type luminescent concentrators. In FIG. 5a, all light sources are substantially identical.

In FIG. 5b, schematically an embodiment is depicted wherein the plurality of light sources 10 comprise a first subset 5110 of light sources 10 configured to provide first subset light source light 5111 and a second subset 5210 of light sources 10 configured to provide second subset light source light 5211, the first subset light source light 5111 and the second subset light source light 5211 having different spectral distributions. Especially, the two or more of the luminescent materials 1120, 2120, 3120 have mutually different excitation oscillator strength ratios for the first subset light source light 5111 and the second subset light source light 5211. For instance, UV and blue emitting light sources may be applied. Further, FIG. 5b schematically depicts a control system 430 configured to control the light sources (of the different subsets). For instance, subsets may be controlled, or light sources within subsets may be controlled. In this way, not only the intensity of the lighting device light 1111 may be controlled but also the spectral distribution as the different light sources may ultimately generate converter light (and optionally remaining light source light) with different spectral distributions. The lighting device light in this embodiment comprises converter light of one or more luminescent concentrators and optionally light source light of one or more of the light source(s) of one or more of the subsets of light sources.

Figure 6A:
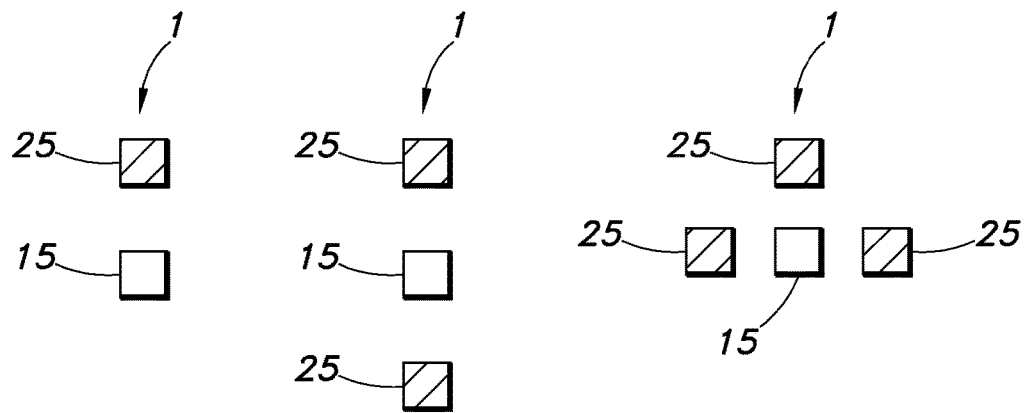
FIGS. 6a-6b schematically depict yet some further embodiments of possible stacks.
Figure 6B:
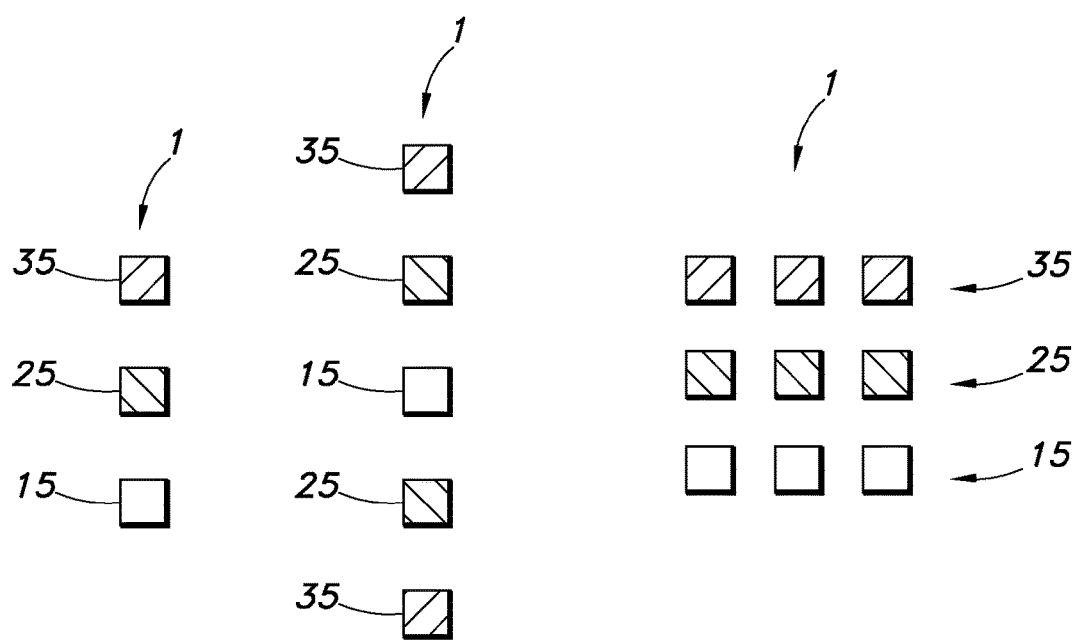

FIGS. 6a-6b schematically depict in total six possible configurations of the luminescent concentrators, though much more configuration may be possible, with FIG. 6a showing a first luminescent concentrator 15 and one or more second luminescent concentrators 25, and FIG. 6b showing a first luminescent concentrator 15, one or more second luminescent concentrators 25 and one or more third luminescent concentrators 35 (with the most right set in fact being a triple edition of the left set). In embodiments, at least part of the luminescent material light that escapes from a side edge from a lower order luminescent concentrator is reflected via one or more mirrors to the higher order luminescent concentrator. For instance, referring to the left variant in FIG. 6a, at a first side of the first concentrator 15, the second luminescent concentrator 25 is configured. When configuring at the other side a mirror (at a non-zero distance), light may be reflected back into the first luminescent concentrator 15, and part thereof may then reach the second luminescent concentrator 25.

Different materials may be used as luminescent material (see also above). For example, the following components can be used for obtaining high intense yellow light: LEDs: Blue LEDs emitting blue light e.g. 460 nm; primary transparent luminescent light guide: absorbing blue light and emitting green light e.g. 520 nm (e.g. Ce doped LuAG); secondary transparent luminescent light guide: absorbing green light and emitting yellow light e.g. 560 nm (e.g. quantum dots). In another example, the following components can be used for obtaining high intense red light: LEDs: Blue LEDs emitting blue light e.g. 460 nm; primary transparent luminescent light guide: absorbing blue light and emitting yellow light e.g. 550 nm (e.g. Ce doped LuAG); secondary transparent luminescent light guide: absorbing yellow light and emitting red light e.g. 620 nm (e.g. quantum dots). In yet another example, the following components can be used for obtaining high intense green light: LEDs: UV LEDs emitting UV light e.g. 390 nm; primary transparent luminescent light guide: absorbing UV light and emitting blue light e.g. 440 nm (e.g. $Eu^{2+}$ doped $BaMgAl_{10}O_{17}$ and/or $Eu^{2+}$ doped $Sr_5(PO_4)_3Cl$); secondary transparent luminescent light guide: absorbing blue light and emitting green light e.g. 520 nm (e.g. Ce doped LuAG YAG for yellow green emission).

The light source used herein is preferably a solid state light emitter. Examples of solid state light emitters are Light Emitting Diodes (LEDs), Organic Light Emitting diode(s) OLEDs, or, for example, laser diodes. Solid state light emitters are relatively cost effect light sources because they are, in general, not expensive, have a relatively large efficiency and a long life-time. The light source is preferably a UV, Violet or Blue light source.

In first embodiments a stack of blue, green and red concentrator, pumped using UV-LEDs can be provided. In the first concept, a blue luminescent concentrator, a green luminescent concentrator and a red luminescent concentrator are stacked and pumped using UV LED. The UV LED pumps the blue luminescent material. Part of the blue light generated is wave-guided to the nose. The part of the blue light that is not within the Total internal reflection (TIR) regime will excite the green luminescent concentrator. Since the absorption spectrum of the green luminescent concentrator is (mainly) in the blue, a large fraction of this light is converted into green, of which part is again wave-guiding to the nose. The part of the green light that is generated and not within TIR may be used to excite the red luminescent concentrator. In order to do so, the red luminescent concentrator material may have an excitation spectrum significantly overlapping with the green light (e.g. Eu-doped nitrides, lumogen).

The red materials that are nowadays available may suffer from two mayor drawbacks: the emission is in the orange (leading to a too low CRI) and the excitation spectrum is only slightly redshifted with respect to the yellow/green excitation spectrum (limiting the amount of re-absorption). To generate enough red light, using a red luminescent concentrator material with an excitation spectrum that is not significantly deviating from the green/yellow material, the thickness and/or composition of the green material should be chosen such that part of the blue light is transmitted through the green luminescent concentrator.

In second embodiments stack of blue, green and red luminescent concentrator, pumped using a mixture of blue and UV-LEDs is provided. These embodiments may further essentially further be identical to the previous embodiments, with thus the extension that a combination of UV and blue LEDs is used, that can be controlled, for instance in two separate strings. These embodiments introduces a larger degree of freedom for the color tuneability, see e.g. FIGS. 7a and 7b. Light leaking out of the luminescent concentrator blue luminescent concentrator can be used to pump the green and red luminescent concentrator. Light leaking out of the green luminescent concentrator can be used to pump the red luminescent concentrator. Blue light can be used to excite the green and red luminescent concentrator, which introduced some color tuneability. References 10a and 10b are used to indicate different light sources (i.e. especially solid state light sources providing radiation having different spectral distributions). In this way, two or more subsets of different light sources may be provided (with within the subset essentially identical light sources). optionally, the light sources, or the subsets of light sources may be individually controlled. To this end a control system may be used (not depicted).

In yet further embodiments a stack of blue, green and red luminescent concentrator, pumped using a mixture of blue and UV-LEDs is provided. Again, these embodiments may be essentially identical to the first embodiments, with the extension that a combination of blue and UV LEDs is used to pump the blue and green luminescent concentrator. The blue LEDs from the top are used to pump the red luminescent concentrator. This will further extend the color tuneability of the system. Alternatively, instead of using a red luminescent concentrator, a red LED can be placed at the surface opposite to the nose. FIGS. 7c and 7d show that UV/Blue light from bottom excites blue/green luminescent concentrator. Red luminescent concentrator is mainly excited by blue LEDs from the top. Improved efficiency and color tuneability by stacking of the luminescent concentrators/choice and position of LEDs may be obtained.

In fourth embodiments, a stack of blue, green and red luminescent concentrator, pumped using a mixture of blue and UV-LEDs, using luminescent concentrators of different lengths. In the previous embodiments, the generation of pure colors may be difficult. For instance, the blue light leaking from the sides of the luminescent concentrator will excite the green and/or the red phosphor, leading to a blue spectrum 'polluted' by green and red (that is what we use to increase the efficiency). By using a blue luminescent concentrator that is significantly longer then the green and the red luminescent concentrator, and only exciting the blue luminescent concentrator in this area, the blue light leakage will not lead to excitation of the green and/or red luminescent concentrator (FIGS. 7e and 7f). In order to be able to make pure blue light, the blue luminescent concentrator extends at the side opposite of the extraction element. A similar approach can be used for green. The pure colors can be generated with 'traditional' luminescent concentrator efficiency. White light can be generated with improved efficiency. FIGS. 7e and 7f show that UV/Blue light from bottom excites blue/green luminescent concentrator. The red luminescent concentrator is mainly excited by blue LEDs from the top. Improved efficiency and color tuneability by stacking of the luminescent concentrators/choice and position of LEDs may be obtained. Due to the extended lengths of the blue and green luminescent concentrator, more pure blue and green can be generated. FIGS. 7e and 7f schematically shows an embodiment wherein one or more of the luminescent concentrators 15,25, . . . are longer than one or more of the other luminescent concentrators 15,25, . . . , thereby providing one or more luminescent concentrator extending parts 415,425, . . . extending relative to the one or more other luminescent concentrators 15,25, . . . , and wherein a subset of the light sources 10 is configured to provide light source radiation 11 to the one or more luminescent concentrator extending parts 415,425, . . . . Hence, the two or more luminescent concentrators may have different lengths. The indications "15,25, . . . ," and similar indications especially refer that there may be at least two items (here concentrators), but there may also be more items (concentrators).

Note that here the first luminescent concentrator has a first length L1 which is longer than a second length L2 of the second luminescent concentrator, and which latter is again longer than a third length L3 of the third luminescent concentrator. Hence, L1>L2>L3. However, also embodiments may be possible with one of the luminescent concentrators having a length different than two luminescent concentrators having essentially identical lengths.

FIGS. 7a, 7c, 7e schematically depict side views of possible embodiments, and FIGS. 7b, 7d, and 7e schematically depict cross sections of such embodiments. Note that lighting (pumping) may be from below and/or above, but may additionally or alternatively also from the side(s) (e.g. left and right from the waveguides as schematically depicted in the cross-sectional views (light sources not depicted)). In FIGS. 7a, 7c, 7e the luminescent concentrators 15,25,35 may each comprise a different luminescent materials, such that e.g. blue, green and red concentrator light may be provided respectively, leading to e.g. white device light. By using different subsets of light sources 5110, 5210 and/or different arrangements (pumping positions, see FIGS. 7c and 7e) the spectral distribution of the device light may be tuned. Hence, control system 430 may control the light sources 10 (of the different subsets). Such control system may be used in any embodiment of the lighting device described herein.

FIG. 7e shows a device with luminescent concentrators having lengths L1, L2 and L3. Note the optional mirrors 21 at each first face 141 of the respective luminescent concentrator 15,25,35. The extending parts are indicated with the general reference 400, and with reference 415 for the extending part of the first luminescent concentrator 15 and reference 425 for the extending part of the second luminescent concentrator 25. Of course, there may be more than three luminescent concentrators. There may e.g. be more than one group of light sources, indicated as subset. Hence, there may be two or more subsets of light sources. Especially, each subset may include light sources with essentially identical spectral distributions, such as of the same bin, but light sources of different subsets having different spectral distributions, such as from different bins. For instance, one or more subsets 1415,1425, . . . of each one or more light sources 10 are configured to provide light source radiation 11 to the one or more luminescent concentrator extending parts 415,425, . . . , respectively. Reference 1400 is used to indicate in general subsets that are especially configured to pump with light source light essentially an extending part 400 and not the remaining part of the luminescent concentrator 5. Referring to FIG. 7e, the part left from L2 is the extending part of the first luminescent concentrator 15; the length of the first essentially identical to L2 is the remaining part of the luminescent concentrator.

Note that the second luminescent concentrator extending part 425 has over the length of the second luminescent concentrator extending part 425 the first luminescent concentrator configured adjacent and parallel, while over the same length there is (along another side edge) no luminescent concentrator arranged parallel and adjacent. Over the remaining part of the length of the second luminescent concentrator, along two side edges other luminescent concentrators are configured parallel and adjacent. Hence, over length L2, the first luminescent concentrator is configured adjacent and parallel along a side edge, and over length L3 in this schematically depicted embodiment both the third and the first luminescent concentrators are configured parallel and adjacent to (different) side edges. When the first luminescent concentrator is pumped, light may escape to the second luminescent concentrator. When the second luminescent concentrator is pumped in the second luminescent concentrator extending part 425, light that might escape (downstream from the extending part) to the first luminescent concentrator, if any light escapes, may substantially have no impact on the spectral distribution. Light that might escape (downstream from the extending part) to the third luminescent concentrator, if any light escapes, may have some impact on the spectral distribution. However, due to the fact that the second luminescent concentrator extending part 425 is primarily pumped light that is not with the TIR regime in the second luminescent concentrator extending part 425 may have already escaped and light that is within the TIR regime in the second luminescent concentrator extending part 425 may propagate downstream to the exit window and escape. Further, reabsorption effects may also reduce over the length of the luminescent concentrator. In this way, pumping of a luminescent concentrator extending part may provide device light that comprises converter light essentially only of the respective luminescent concentrator.

Hence, FIG. 7e schematically depicts yet other subsets than schematically depicted in FIG. 7c. Referring to FIGS. 7c and 7e UV LEDs may be configured to pump a blue luminescent concentrator, such as e.g. first luminescent concentrator 15, and blue LEDs may be configured to pump a green luminescent concentrator, such as e.g. second luminescent concentrator.

Applications include but are not limited to projectors, lamps, luminaires, or other lighting systems such as shop lighting systems, home lighting systems, accent lighting systems, spot lighting systems, theater lighting systems, fiber-optics application systems, projection systems, display systems, warning sign systems, medical lighting application systems, indicator sign systems, and decorative lighting systems, portable systems and automotive applications.

The fact that herein up to the third order luminescent concentrator is described, does not exclude that even higher order luminescent concentrators may be applied, with the same principles as described herein in relation to the first, second and third luminescent concentrators.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
a plurality of luminescent concentrators including at least a first luminescent concentrator and a second luminescent concentrator, each luminescent concentrator of the plurality of luminescent concentrator comprising an elongated light transmissive body having a first face and a second face defining a length of the elongated body, the elongated body comprising one or more side edges, wherein one or more side edges comprise one or more radiation input faces, wherein the second face comprises a radiation exit window; the elongated light transmissive body comprising a luminescent material configured to convert at least part of a pump radiation received at the one or more radiation input faces into luminescent material light, and each luminescent concentrator configured to couple at least part of the luminescent material light out at the radiation exit window as converter light;

a plurality of light sources configured to provide light source radiation as first pump radiation to the one or more radiation input faces of a first luminescent concentrator;

said first luminescent concentrator comprising a first luminescent material configured to convert at least part of the first pump radiation into first luminescent material light, and configured to couple at least part of the first luminescent material light out at the first radiation exit window as first converter light;

said second luminescent concentrator configured parallel to the first luminescent concentrator with a side edge of the first luminescent concentrator configured parallel to a side edge of the second luminescent concentrator, wherein the second luminescent concentrator is configured to receive at said side edge of the second luminescent concentrator one or more of said first pump radiation and said first luminescent material light escaping from said side edge of said first luminescent concentrator as second pump radiation, the second luminescent concentrator comprising a second luminescent material configured to convert at least part of the second pump radiation into second luminescent material light, and configured to couple at least part of the second luminescent material light out at the second radiation exit window as second converter light; and wherein one or more of the luminescent concentrators are longer than one or more of the other luminescent concentrators, thereby providing one or more luminescent concentrator extending parts extending relative to the one or more other luminescent concentrators, and wherein a subset of one or more light sources is configured to provide light source radiation to the one or more luminescent concentrator extending parts.

2. The lighting device according to claim 1, wherein one or more of the plurality of light sources are configured to provide at least one of:

i) UV light source radiation as the first pump radiation, wherein the first luminescent material is configured to convert at least part of the first pump radiation into blue first luminescent material light, and wherein the second luminescent material is configured to convert at least part of the second pump radiation into yellow second luminescent material light, and ii) blue light source radiation as the first pump radiation, wherein the first luminescent material is configured to convert at least part of the first pump radiation into green first luminescent material light, and wherein the second luminescent material is configured to convert at least part of the second pump radiation into one or more of yellow second luminescent material light and red second luminescent material light.

3. The lighting device according to claim 1, wherein the first luminescent concentrator is configured to transmit at least part of the light source radiation, and wherein the second pump radiation comprises at least part of said light source radiation transmitted by said first luminescent concentrator.

4. The lighting device according to claim 1, wherein one or more subsets of each one or more light sources are configured to provide light source radiation to the one or more luminescent concentrator extending parts, respectively.

5. The lighting device according to claim 1, comprising a luminescent concentrator having a longer length than another luminescent concentrator, the former luminescent concentrator having an extending part relative to the latter, wherein the former luminescent concentrator is configured to provide converter light having a spectral distribution being blue shifted relative to a spectral distribution of converter light provided by said latter luminescent concentrator.

6. The lighting device according to claim 1, wherein the plurality of light sources comprise a first subset of light sources configured to provide first subset light source light and a second subset of light sources configured to provide second subset light source light, the first subset light source light and the second subset light source light having different spectral distributions and wherein two or more of the luminescent materials have mutually different excitation oscillator strength ratios for the first subset light source light and the second subset light source light.

7. The lighting device according to claim 1, wherein two parallel arranged luminescent concentrators are not in physical contact with each other or have a dichroic mirror arranged in between.

8. The lighting device according to claim 1, wherein the elongated light transmissive body comprises a geometrical concentration factor, defined as the ratio of the area of the radiation input faces and the area of the radiation exit window, of at least 2, and wherein the lighting device further comprising a collimator configured downstream of the radiation exit window and configured to collimate the converter light, wherein the length is selected from the range of 10-500 mm, and wherein the elongated light transmissive body of one or more luminescent concentrators comprise an elongated ceramic body, wherein the lighting device is configured to provide white lighting device light.

9. The lighting device according to claim 1, wherein the lighting device is configured to provide device light comprising converter light of one or more luminescent concentrators, wherein the lighting device further comprises a control system configured to control one or more of intensity, color temperature and color of the device light by controlling a light intensity of the plurality of light sources.

10. The lighting device according to claim 9, wherein the lighting device is configured to provide one of white device light and colored device light in dependence of a setting chosen by the control system.

11. The lighting device according to claim 1, further comprising:

a third luminescent concentrator configured parallel to the second luminescent concentrator with a side edge of the second luminescent concentrator configured parallel to a side edge of the third luminescent concentrator, wherein the third luminescent concentrator is configured to receive at said side edge of the third luminescent concentrator one or more of said first pump radiation, said first luminescent material light, and said second luminescent material light escaping from said side edge of said second luminescent concentrator as third pump radiation, the third luminescent concentrator comprising a third luminescent material configured to convert at least part of the third pump radiation into third luminescent material light, and configured to couple at least part of the third luminescent material light out at the third radiation exit window as third converter light.

12. The lighting device according to claim 11, wherein the plurality of light sources are configured to provide UV light source radiation as first pump radiation, wherein the first luminescent material is configured to convert at least part of the first pump radiation into blue first luminescent material light, wherein the second luminescent material is configured to convert at least part of the second pump radiation into one or more of green second luminescent material light and yellow second luminescent material light, and wherein the third luminescent concentrator is configured to convert at least part of the third pump radiation into red third luminescent material light.

13. The lighting device according to claim 11, wherein one or more of the following applies:
the first luminescent concentrator is configured to transmit at least part of the light source radiation, and the second pump radiation comprises at least part of said light source radiation transmitted by said first luminescent concentrator; and
the second luminescent concentrator is configured to transmit at least part of one or more of said light source radiation and said first luminescent material light, and wherein the third pump radiation comprises at least part of one or more of said light source radiation transmitted by said second luminescent concentrator and said first luminescent material light transmitted by said second luminescent concentrator.

14. The lighting device according to claim 11, further comprising a second lighting device configured to generate red second lighting device light and configured to provide said second lighting device light at one or more of a first face of said first luminescent concentrator, a first face of said second luminescent concentrator, and a first face of on optional third luminescent concentrator.

15. The lighting device according to claim 14, further comprising a plurality of second light sources configured to generate second light source light as first secondary pump radiation to the one or more radiation input faces of one or more of the second luminescent concentrator, wherein the second luminescent concentrator comprises said second luminescent material configured to convert at least part of the first secondary pump radiation into said second luminescent material light, and an optional third luminescent concentrator, wherein the optional third luminescent concentrator comprises a third luminescent material configured to convert at least part of the first secondary pump radiation into third luminescent material light.

* * * * *